(12) United States Patent
Kusaki et al.

(10) Patent No.: US 12,165,349 B2
(45) Date of Patent: Dec. 10, 2024

(54) ORTHO-IMAGE CREATION SYSTEM, ORTHO-IMAGE CREATION METHOD, SURVEY MARKER USED THEREFOR AND ROAD SURVEY METHOD

(71) Applicant: MR Support Inc., Kyoto (JP)

(72) Inventors: Shigeo Kusaki, Kyoto (JP); Takamitsu Mori, Kyoto (JP)

(73) Assignee: MR Support Inc., Kyoto (JP)

( * ) Notice: Subject to any disclaimer, the term of this patent is extended or adjusted under 35 U.S.C. 154(b) by 365 days.

(21) Appl. No.: 17/619,352

(22) PCT Filed: Apr. 14, 2020

(86) PCT No.: PCT/JP2020/016454
§ 371 (c)(1),
(2) Date: Dec. 15, 2021

(87) PCT Pub. No.: WO2020/255548
PCT Pub. Date: Dec. 24, 2020

(65) Prior Publication Data
US 2022/0366591 A1  Nov. 17, 2022

(30) Foreign Application Priority Data

Jun. 17, 2019 (JP) .................... 2019-112106
Nov. 18, 2019 (JP) .................... 2019-208284

(51) Int. Cl.
*G06T 7/62* (2017.01)
*G01B 11/30* (2006.01)

(52) U.S. Cl.
CPC ............ *G06T 7/62* (2017.01); *G01B 11/30* (2013.01); *G06T 2207/10032* (2013.01)

(58) Field of Classification Search
CPC ........... G06T 7/62; G06T 2207/10032; G06T 2207/30184; G06T 7/73; G06T 17/05;
(Continued)

(56) References Cited

U.S. PATENT DOCUMENTS 5,606,627 A * 2/1997 Kuo .................. G06T 7/593
348/E13.067
6,442,293 B1  8/2002 Ito et al.
(Continued)

FOREIGN PATENT DOCUMENTS

CN  109191574 A * 1/2019
JP  11-351865 A  12/1999
(Continued)

OTHER PUBLICATIONS

Office Action dated Aug. 29, 2023, issued in counterpart JP application No. 2019-208284, with English translation. (12 pages).
(Continued)

*Primary Examiner* — Jose L Couso
(74) *Attorney, Agent, or Firm* — WHDA, LLP

(57) ABSTRACT

When repairing a road, it is possible to easily conduct a survey on the road condition at the time of starting repair. The ortho-image creation method of the present invention includes a coordinate acquisition step to acquire three-dimensional coordinates of a plurality of survey markers 6, a photography step to photograph a plurality of photographed images of the plurality of survey markers 6 by a UAV 3 flying at an altitude of 20 meters or less above the ground in such a manner that each survey marker 6 is included in at least two of the photographed images, and an ortho-image creation step to create an ortho-image on the basis of the three-dimensional coordinates of each feature point acquired by the coordinate acquisition step and the plurality of photographed images photographed by the photography step.

12 Claims, 32 Drawing Sheets

(58) Field of Classification Search
CPC ........... G06T 15/20; G06T 2207/10028; G06T 2207/30181; G06T 2207/30204; G06T 2207/30226; G06T 7/75; G06T 15/205; G06T 19/023; G06T 7/80; G06T 3/4046; G06T 9/002; G06T 2207/20076; G06T 2207/20081; G06T 2207/20084; G01B 11/30; G01B 11/25; E01C 23/01; G01C 7/02; G01C 11/04; G01C 11/06; G01C 15/00; G01C 15/06; G01C 11/02; G01C 11/28; G01C 15/002; G01C 11/08; G01N 21/88; G01S 19/01; G06V 20/176; G06V 20/182; G06V 20/64; G06V 20/647; G06V 20/13; G06V 10/454; G06V 10/54; G06V 10/774; G06V 10/82; G06V 30/18057; G06F 18/22; G06F 16/70; H04N 13/204; H04N 13/275; H04N 21/816; B64C 2203/00; B64C 39/024; B64D 47/08; B64U 10/13; B64U 10/14; B64U 2101/10; B64U 2101/20; B64U 2101/30; G05D 1/104; G05D 1/0234; G05D 1/0246; G05D 1/0274; G05D 1/0276; G06N 3/02; G06N 3/08–088; G06N 3/0445; G06N 3/0454; G06N 3/4046; G06N 7/00; G06N 7/01; G06N 20/00; G06K 7/1482; Y10S 128/925
See application file for complete search history.

(56) References Cited

U.S. PATENT DOCUMENTS

| | | | | |
|---|---|---|---|---|
| 10,665,035 | B1* | 5/2020 | Perkins | G06T 7/579 |
| 2002/0191839 | A1 | 12/2002 | Ito et al. | |
| 2004/0131248 | A1 | 7/2004 | Ito et al. | |
| 2005/0213808 | A1* | 9/2005 | Ohtomo | G01C 11/04 |
| | | | | 382/154 |
| 2011/0164037 | A1 | 7/2011 | Yoshida et al. | |
| 2014/0049617 | A1* | 2/2014 | Kodaira | G06F 16/56 |
| | | | | 348/48 |
| 2016/0217582 | A1* | 7/2016 | Sasaki | G06T 7/55 |
| 2017/0004345 | A1* | 1/2017 | Sasaki | G06T 7/73 |
| 2018/0174290 | A1* | 6/2018 | Yoshida | G06T 7/0002 |
| 2019/0073794 | A1* | 3/2019 | Sasaki | G06T 7/75 |
| 2019/0266396 | A1* | 8/2019 | Greveson | G06F 18/22 |

FOREIGN PATENT DOCUMENTS

| | | | | | |
|---|---|---|---|---|---|
| JP | 2005-140550 | A | | 6/2005 | |
| JP | 2006-10312 | A | | 1/2006 | |
| JP | 2013-186005 | A | | 9/2013 | |
| JP | 2013171455 | A | * | 9/2013 | |
| JP | 2015-190978 | A | | 11/2015 | |
| JP | 2016-85100 | A | | 5/2016 | |
| JP | 2018-21375 | A | | 2/2018 | |
| JP | 2018-25553 | A | | 2/2018 | |
| JP | 2018-123510 | A | | 8/2018 | |
| JP | 2018205264 | A | * | 12/2018 | ............. G01C 11/04 |
| KR | 2019051704 | A | * | 5/2019 | ............. G01S 19/14 |
| WO | 2010/024212 | A1 | | 3/2010 | |
| WO | WO-2014175217 | A1 | * | 10/2014 | ............. G06T 17/05 |

OTHER PUBLICATIONS

Office Action dated Mar. 14, 2023, issued in counterpart JP Application No. 2019-208284, with English translation. (10 pages).

International Search Report dated Jun. 30, 2020, issued in counterpart International Application No. PCT/ JP2020/016454 (3 pages).

Office Action dated Feb. 6, 2024, issued in counterpart JP Application No. 2019-208284, with English translation. (13 pages).

Inzerillo L. et al., Image-based 3D reconstruction using traditional and UAV datasets for analysis of road pavement distress, Automation in Construction, vol. 96, p. 457-469, Oct. 18, 2015; cited in JP Office Action dated Feb. 6, 2024. (14 pages).

W/English Abstract; Ministry of Land, Infrastructure, Transport and Tourism, Geospatial Information Authority of Japan, Public training manual using UAV (draft), Mar. 2017, https://www.gsi.go.jp/common/000186712.pdf; cited in JP Office Action dated Feb. 6, 2024. (13 pages).

W/English Abstract; Nishimura, New development of three dimensional image sensing, Kabushikikaisha N.T.S.; May 29, 2015, vol. 5, No. 1, p. 345-352; cited in JP Office Action dated Feb. 6, 2024. (20 pages).

W/English Abstract; Kimura Shun, Construction TEC Revolution, Nikkei BP, Oct. 16, 2018; cited in JP Office Action dated Feb. 6, 2024. (20 pages).

* cited by examiner

FIG.27
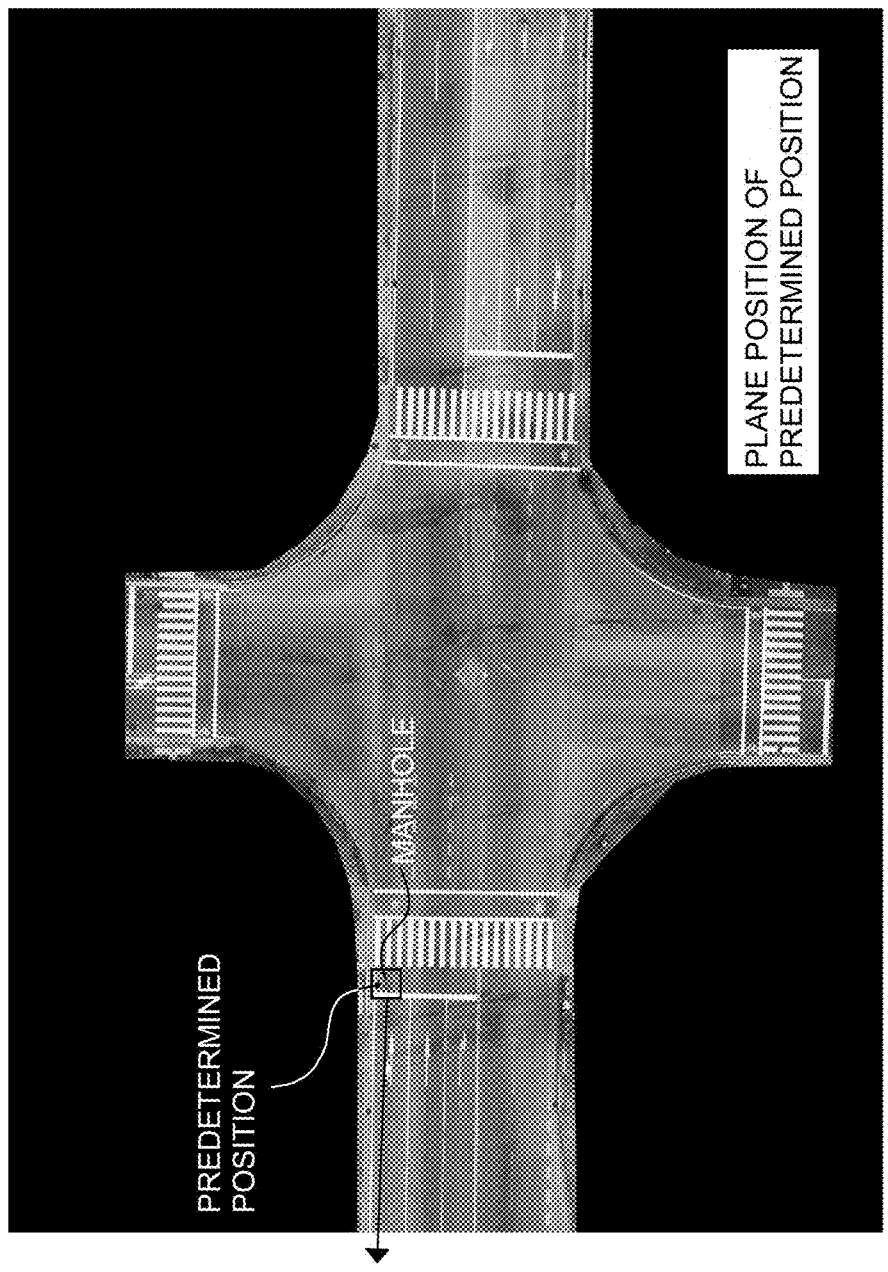
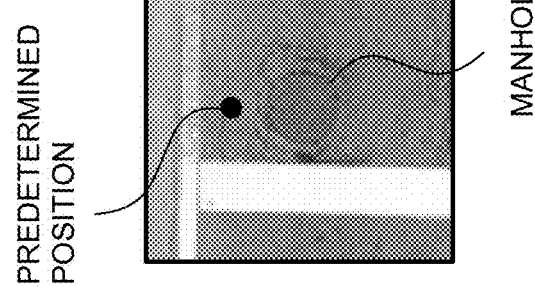

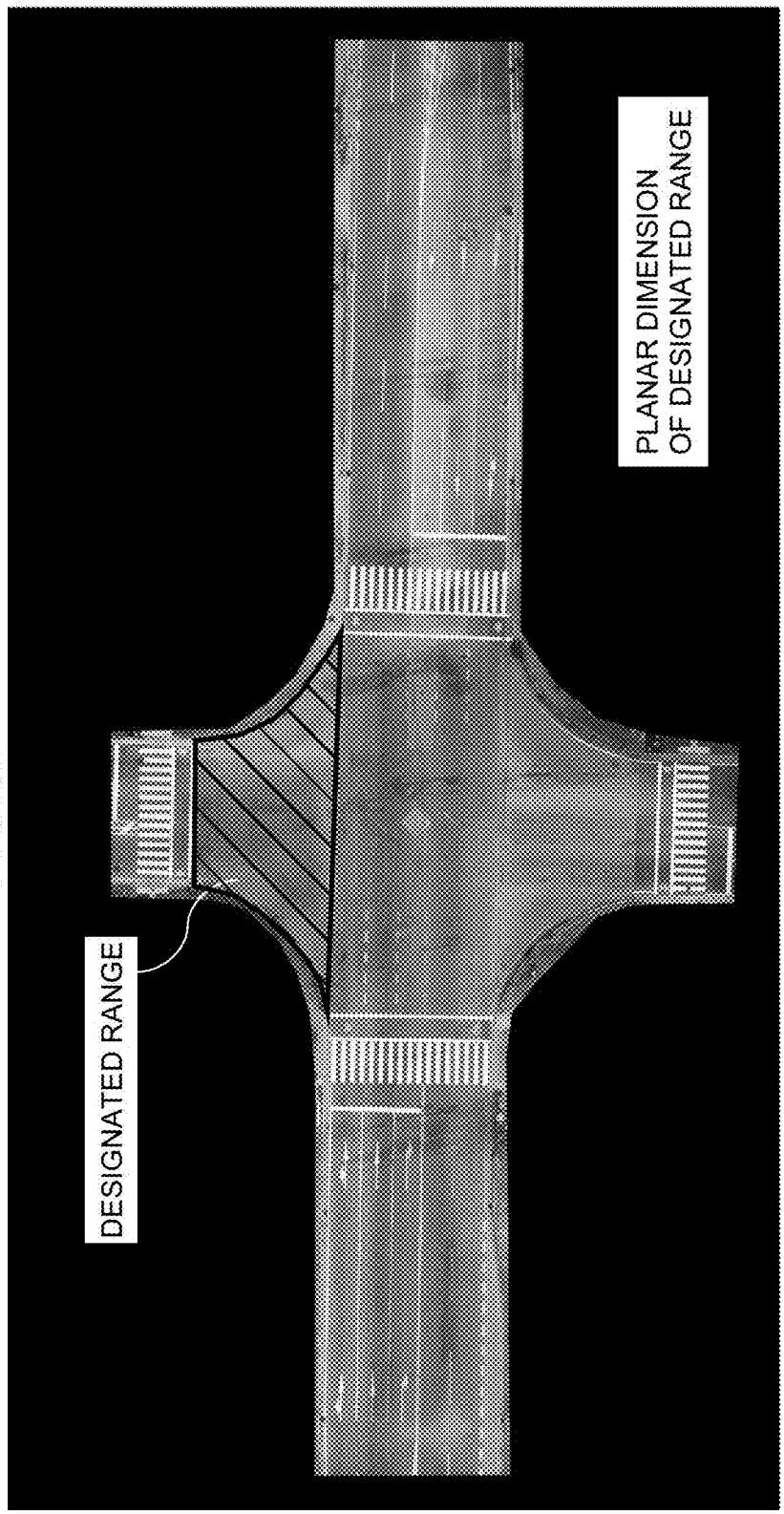

ORTHO-IMAGE CREATION SYSTEM, ORTHO-IMAGE CREATION METHOD, SURVEY MARKER USED THEREFOR AND ROAD SURVEY METHOD

TECHNICAL FIELD

The present invention relates to an ortho-image creation system and an ortho-image creation method that create an ortho-image on the basis of photographed images photographed from the sky by, for example, an unmanned aerial vehicle, and a survey marker used therefor and a road survey method.

BACKGROUND ART

Conventionally, when damage such as cracks occurs on a surface of asphalt pavement that constitutes a surface layer of a road, it is necessary to repair the road.

In order to repair a road, various surveys on the road condition and the locations of plane elements including the edges of the road and division lines such as lane marking lines at the time of starting repair are conducted. For example, a survey is conducted to determine the place and amount of cracks that have occurred on the road. In the past, cracking conditions were visually surveyed by surveyors, but it is very complicated for each surveyor to survey the road and detect cracks. Therefore, instead of detection of a crack by a surveyor, the road condition is sometimes surveyed with the use of a special road surface condition survey vehicle (see Patent Document 1).

PRIOR ART DOCUMENT

Patent Document

Patent Document 1: Japanese Unexamined Patent Application Publication No. 2018-123510

SUMMARY OF THE INVENTION

Technical Problem

When the road condition is surveyed by the special road surface condition survey vehicle, it is necessary to cause the road surface condition survey vehicle to travel. However, the road surface condition survey vehicle cannot travel on a road with a small width, and therefore it is impossible to survey the road condition.

In addition, surveys on the locations of plane elements including the edges of the road and division lines such as lane marking lines in a repair area where repair is to be performed are conducted. In the past, a very large number of plane positions on the edge of a road and lane marking lines were surveyed, and on the basis of each plane position, the locations of plane elements including the edges of the road and division lines such as lane marking lines were illustrated. Therefore, it is necessary to survey on a very large number of plane positions in order to illustrate the plane elements, which is very complicated.

If there are manholes in the repair area, a survey on a manhole adjustment height will be conducted. As a survey on the manhole adjustment height, an adjustment height (a difference in elevation between the elevation at the time of starting repair and the elevation of a repair planning plane) at each position in the manhole in the longitudinal and transverse directions is surveyed.

In the past, the elevation of each plane position was detected on the basis of a road longitudinal section and a road transverse section passing through each plane position in the periphery of a manhole, and the adjustment height was derived by the difference in elevation between the elevation and the elevation of the repair planning plane. Therefore, it is necessary to detect the elevation of each plane position on the basis of the road longitudinal section and the road transverse section, respectively, for each manhole, which is very complicated.

It is an object of the present invention to provide an ortho-image creation system and an ortho-image creation method that make it possible to easily survey a road condition at the time of starting repair when repairing the road, and a survey marker used therefor and a road survey method.

Solution to Problem

In order to solve such an issue, the present invention has the following measures.

That is, an ortho-image creation system according to the present invention includes a coordinate storage means to store three-dimensional coordinates of a plurality of feature points, a photographed image storage means to store a plurality of photographed images of the plurality of feature points photographed by an unmanned aerial vehicle or a model aerial vehicle flying at an altitude of 20 meters or less above the ground in such a manner that each feature point is included in at least two of the photographed images, and an ortho-image creation means to create an ortho-image on a basis of the three-dimensional coordinates of each feature point stored in the coordinate storage means and the plurality of photographed images stored in the photographed image storage means.

An ortho-image creation method according to the present invention includes a coordinate acquisition step to acquire three-dimensional coordinates of a plurality of feature points, a photography step to photograph a plurality of photographed images of the plurality of feature points by an unmanned aerial vehicle or a model aerial vehicle at an altitude of 20 meters or less above the ground in such a manner that each feature point is included in at least two of the photographed images, and an ortho-image creation step to create an ortho-image on a basis of the three-dimensional coordinates of each feature point acquired by the coordinate acquisition step and the plurality of photographed images photographed by the photography step.

As a result, the ortho-image creation system and the ortho-image creation method according to the present invention create an ortho-image on the basis of a plurality of photographed images photographed by an unmanned aerial vehicle or a model aerial vehicle flying at an altitude of 20 meters or less above the ground, thereby making it possible to create an ortho-image in which the condition of a road surface and the location of plane elements around the road can be clearly distinguished. In the ortho-image created by the present invention, it is possible to clearly distinguish the places where cracks and patching have occurred in a road. Therefore, it is not necessary to drive a special road surface condition survey vehicle to survey the cracking condition of a road surface, and it is possible to survey the road condition regardless of the road width.

In addition, in the ortho-image created by the present invention, it is possible to clearly distinguish the locations of plane elements including the edges of the road and division lines such as lane marking lines. Therefore, there is no need to survey on a large number of plane positions in order to illustrate the plane elements including the edges of the road and division lines such as lane marking lines, and thus it is possible to easily illustrate the plane elements on the basis of an ortho-image.

In addition, in the ortho-image created by the present invention, each plane position in the periphery of a manhole in the longitudinal and transverse directions can be detected. Therefore, after identifying each plane position in the periphery of a manhole in the longitudinal and transverse directions, the elevation of each plane position can be retrieved from the point group data acquired by a three-dimensional scanning device. Therefore, it is not necessary to create a road longitudinal section and a road transverse section for each manhole in order to detect the elevation of each plane position in the periphery of a manhole in the longitudinal and transverse directions, respectively. Consequently, it is possible to easily detect the manhole adjustment height.

In the ortho-image creation system according to the present invention, the feature point is a survey marker installed on a ground at a time of photographing by the unmanned aerial vehicle or the model aerial vehicle, and the coordinate storage means stores the three-dimensional coordinates of the survey marker acquired by a total station, a positioning system using satellites, and a three-dimensional scanning device.

In the ortho-image creation method according to the present invention, the feature point is a survey marker installed on a ground at a time of photographing in the photography step, and in the coordinate acquisition step, three-dimensional coordinates of the survey marker are acquired by a total station, a positioning system using satellites, and a three-dimensional scanning device.

As a result, the ortho-image creation system and the ortho-image creation method according to the present invention create an ortho-image on the basis of the photographed images photographed by the unmanned aerial vehicle or the model aerial vehicle, thereby making it possible to create an ortho-image in which the condition of a road surface and the location of plane elements around the road can be clearly distinguished.

In the ortho-image creation system according to the present invention, the feature point is a predetermined point in an image photographed by the unmanned aerial vehicle or the model aerial vehicle, and the coordinate storage means stores three-dimensional coordinates of a predetermined point retrieved from point group data in three-dimensional coordinates acquired for each point in the photographed image.

In the ortho-image creation method according to the present invention, the feature point is a predetermined point in an image photographed by the unmanned aerial vehicle or the model aerial vehicle, and in the coordinate acquisition step, three-dimensional coordinates of a predetermined point are acquired from point group data in three-dimensional coordinates acquired for each point in the photographed image.

As a result, the ortho-image creation system and the ortho-image creation method according to the present invention create an ortho-image on the basis of the photographed images photographed by the unmanned aerial vehicle or the model aerial vehicle, thereby making it possible to create an ortho-image in which the condition of a road surface and the location of plane elements around the road can be clearly distinguished.

The survey marker according to the present invention is a survey marker used for the ortho-image creation system according to the present invention, and is a seal-like marker having a back surface formed with an adhesive layer. With this, in the survey marker according to the present invention, the survey marker can be easily fixed at an installation place.

The survey marker according to the present invention is a survey marker used for the ortho-image creation method according to the present invention, and is a seal-like marker having a back surface formed with an adhesive layer. With this, in the survey marker according to the present invention, the survey marker can be easily fixed at an installation place.

A road survey method according to the present invention includes a coordinate acquisition step to acquire three-dimensional coordinates of a plurality of feature points, a photography step to photograph a plurality of photographed images of the plurality of feature points by an unmanned aerial vehicle or a model aerial vehicle flying at an altitude of 20 meters or less above the ground in such a manner that each feature point is included in at least two of the photographed images, an ortho-image creation step to create an ortho-image on a basis of the three-dimensional coordinates of each feature point acquired by the coordinate acquisition step and the plurality of photographed images photographed by the photography step, a display step to display the ortho-image on a display unit, a derivation step to divide a survey area into a plurality of survey ranges in the ortho-image displayed on the display unit and derive a cracking rate or patching rate for each of the plurality of survey ranges, and a road condition display step to add a color according to a level of the cracking rate or patching rate of each survey range derived by the derivation step to the ortho-image displayed on the display unit to display a road condition.

As a result, the road survey method according to the present invention creates an ortho-image on the basis of a plurality of photographed images photographed by an unmanned aerial vehicle or a model aerial vehicle flying at an altitude of 20 meters or less above the ground, thereby making it possible to create an ortho-image in which the condition of a road surface and the location of plane elements around the road can be clearly distinguished. In the ortho-image created by the present invention, it is possible to clearly distinguish the places where cracks and patching have occurred in a road. Therefore, it is not necessary to drive a special road surface condition survey vehicle to survey the cracking condition of a road surface, and it is possible to survey the road condition regardless of the road width.

A road survey method according to the present invention includes a coordinate acquisition step to acquire three-dimensional coordinates of a plurality of feature points, a photography step to photograph a plurality of photographed images of the plurality of feature points by an unmanned aerial vehicle or a model aerial vehicle flying at an altitude of 20 meters or less above the ground in such a manner that each feature point is included in at least two of the photographed images, an ortho-image creation step to create an ortho-image on a basis of the three-dimensional coordinates of each feature point acquired by the coordinate acquisition step and the plurality of photographed images photographed by the photography step, a display step to display the ortho-image on a display unit, and a plane element illustration step to trace a plane element in the ortho-image displayed on the display unit to illustrate the plane element.

As a result, the road survey method according to the present invention creates an ortho-image on the basis of a plurality of photographed images photographed by an unmanned aerial vehicle or a model aerial vehicle flying at an altitude of 20 meters or less above the ground, thereby making it possible to create an ortho-image in which the condition of a road surface and the location of plane elements around the road can be clearly distinguished. In the ortho-image created by the present invention, it is possible to clearly distinguish the locations of plane elements including the edges of the road and division lines such as lane marking lines. Therefore, there is no need to survey on a large number of points in order to illustrate the plane elements including the edges of the road and division lines such as lane marking lines, and thus it is possible to easily illustrate the plane elements on the basis of an ortho-image.

A road survey method according to the present invention includes a coordinate acquisition step to acquire three-dimensional coordinates of a plurality of feature points, a photography step to photograph a plurality of photographed images of the plurality of feature points by an unmanned aerial vehicle or a model aerial vehicle flying at an altitude of 20 meters or less above the ground in such a manner that each feature point is included in at least two of the photographed images, an ortho-image creation step to create an ortho-image on a basis of the three-dimensional coordinates of each feature point acquired by the coordinate acquisition step and the plurality of photographed images photographed by the photography step, a display step to display the ortho-image on a display unit, a point group data acquisition step to acquire point group data of an area including a periphery of a manhole in the ortho-image, and an elevation difference derivation step to derive an elevation difference between an elevation in the periphery of the manhole in the ortho-image displayed on the display unit and an elevation in the periphery of the manhole in a repair planning plane.

As a result, the road survey method according to the present invention creates an ortho-image on the basis of a plurality of photographed images photographed by an unmanned aerial vehicle or a model aerial vehicle flying at an altitude of 20 meters or less above the ground, thereby making it possible to create an ortho-image in which the condition of a road surface and the location of plane elements around the road can be clearly distinguished. In the ortho-image created by the present invention, each plane position in the periphery of a manhole in the longitudinal and transverse directions can be detected. Therefore, after identifying each plane position in the periphery of a manhole in the longitudinal and transverse directions, the elevation of each plane position can be retrieved from the point group data of an area including the periphery of the manhole. Therefore, it is not necessary to create a road longitudinal section and a road transverse section for each manhole in order to detect the elevation of each plane position in the periphery of a manhole in the longitudinal and transverse directions, respectively. Consequently, it is possible to easily detect the manhole adjustment height.

A road survey method according to the present invention includes a coordinate acquisition step to acquire three-dimensional coordinates of a plurality of feature points, a photography step to photograph a plurality of photographed images of the plurality of feature points by an unmanned aerial vehicle or a model aerial vehicle flying at an altitude of 20 meters or less above the ground in such a manner that each feature point is included in at least two of the photographed images, an ortho-image creation step to create an ortho-image on a basis of the three-dimensional coordinates of each feature point acquired by the coordinate acquisition step and the plurality of photographed images photographed by the photography step, a point group data acquisition step to acquire point group data of an area in the ortho-image, a display step to display the ortho-image on a display unit, a designation step to designate two designated points separated from each other in the ortho-image displayed on the display unit, and a distance display step to display a distance between the two designated points when the two designated points are designated by the designation step.

As a result, the road survey method according to the present invention creates an ortho-image on the basis of a plurality of photographed images photographed by an unmanned aerial vehicle or a model aerial vehicle flying at an altitude of 20 meters or less above the ground and associates the ortho-image with the point group data of an area in the ortho-image, thereby making it possible to display, for example, the distance between two designated points in the road periphery area in the ortho-image while clearly distinguishing the locations of plane elements including the edges of the road and division lines such as lane marking lines. Therefore, even if the surveyor does not measure the distance between the two designated points on the road periphery area in the road periphery area, the distance between the two designated points can be easily detected by designating the two designated points on the display unit on which the ortho-image is displayed.

A road survey method according to the present invention includes a coordinate acquisition step to acquire three-dimensional coordinates of a plurality of feature points, a photography step to photograph a plurality of photographed images of the plurality of feature points by an unmanned aerial vehicle or a model aerial vehicle flying at an altitude of 20 meters or less above the ground in such a manner that each feature point is included in at least two of the photographed images, an ortho-image creation step to create an ortho-image on a basis of the three-dimensional coordinates of each feature point acquired by the coordinate acquisition step and the plurality of photographed images photographed by the photography step, a point group data acquisition step to acquire point group data of an area in the ortho-image, a display step to display the ortho-image on a display unit, a designation step to designate a designated range in the ortho-image displayed on the display unit, and a planar dimension display step to display a planar dimension of the designated range when the designated range is designated by the designation step.

As a result, the road survey method according to the present invention creates an ortho-image on the basis of a plurality of photographed images photographed by an unmanned aerial vehicle or a model aerial vehicle flying at an altitude of 20 meters or less above the ground and associates the ortho-image with the point group data of an area in the ortho-image, thereby making it possible to display, for example, the planar dimension of the designated range in the road periphery area in the ortho-image while clearly distinguishing the locations of plane elements including the edges of the road and division lines such as lane marking lines. Therefore, even if the surveyor does not measure the planar dimension of the designated range on the road periphery area in the road periphery area, the planar dimension of the designated range can be easily detected by designating the designated range on the display unit on which the ortho-image is displayed.

Advantageous Effect of the Invention

As described above, according to the present invention, an ortho-image is created on the basis of a plurality of photographed images photographed by an unmanned aerial vehicle or a model aerial vehicle flying at an altitude of 20 meters or less above the ground, and thus it is possible to create an ortho-image in which the condition of a road surface and the location of plane elements around the road can be clearly distinguished. In the ortho-image created by the present invention, it is possible to clearly distinguish the places where cracks and patching have occurred in a road and the locations of plane elements including the edges of the road and division lines such as lane marking lines, and it is possible to detect each plane position in the periphery of a manhole in the longitudinal and transverse directions. In the road survey method of the present invention, by designating two designated points on the display unit on which the ortho-image is displayed, the distance between the two designated points can be easily detected. In the road survey method of the present invention, by designating a designated range on the display unit on which the ortho-image is displayed, the planar dimension of the designated range can be easily detected.

BRIEF DESCRIPTION OF THE DRAWINGS

FIG. 27 is a view illustrating a state in which the elevation at a predetermined position in the periphery of a manhole is displayed.

FIG. 32 is a view indicating a state in which the planar dimension in a designated range of a road surface is displayed.

DESCRIPTION OF THE EMBODIMENT

Figure 1:
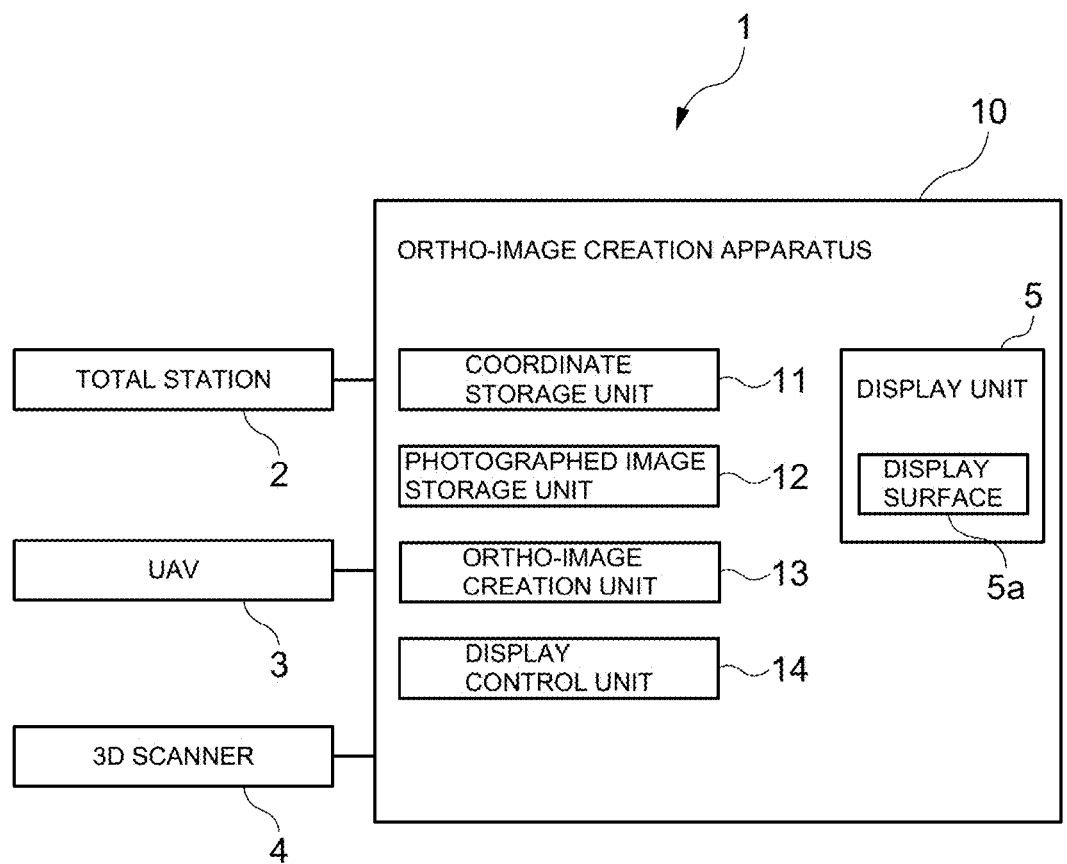
FIG. 1 is a diagram illustrating a schematic configuration of an ortho-image creation system according to an embodiment of the present invention.

Hereinafter, embodiments of the present invention will be described with reference to the drawings. An ortho-image creation system 1 according to an embodiment of the present invention has a total station 2 installed at a known point (e.g., a reference point), a UAV (unmanned aerial vehicle) 3 as a photography device, a 3D scanner 4 (three-dimensional scanning device) installed at the known point, and an ortho-image creation apparatus 10 wirelessly connected to the total station 2, the UAV 3, and the 3D scanner 4.

The total station 2 emits ranging light toward each point on a surface of a road, receives reflected light reflected at each point, acquires three-dimensional coordinates of each point relative to the known point on the basis of the number of times of oscillation of a light wave from the light emission to the light reception, and supplies the three-dimensional coordinates to an ortho-image creation system 10. In this embodiment, the total station 2 is used to acquire the three-dimensional coordinates of a plurality of survey markers 6.

The UAV 3 has a photography device, photographs a road surface from the sky, acquires photography data, and supplies the photography data to the ortho-image creation apparatus 10.

The 3D scanner 4 acquires each point on the road surface as the point group data in three-dimensional coordinates (a set of elevations having plane position coordinates) by irradiating a laser beam, and supplies the point group data to the ortho-image creation system 10. The 3D scanner 4 emits a line laser beam in the vertical and horizontal directions, for example, to an object to be measured (road surface), and the distance to a measurement point can be obtained by measuring the time taken for the laser pulse to travel back and forth between the measurement point of the object to be measured and the sensor. In this embodiment, the 3D scanner 4 is used to acquire the three-dimensional coordinates (point group data) of each point in an area including a repair part where road repair is to be performed at the time of starting the repair. The point group data acquired by the 3D scanner 4 is the data at intervals of, for example, 25 cm or less, and in this embodiment, the 3D scanner 4 acquires the point group data at intervals of, for example, 5 mm.

As illustrated in FIG. 1, the ortho-image creation apparatus 10 is composed of, for example, a microcomputer or the like, and includes a CPU, a ROM that stores a program for controlling operation of the ortho-image creation apparatus 10, and a RAM that temporarily stores data and the like used for execution of the above program.

The ortho-image creation apparatus 10 has a coordinate storage unit 11, a photographed image storage unit 12, an ortho-image creation unit 13, and a display control unit 14. In addition, the ortho-image creation apparatus 10 has a display unit 5 such as a display screen.

The coordinate storage unit 11 separately stores the three-dimensional coordinates of feature points such as the plurality of survey markers 6 and the like acquired by the total station 2.

The photographed image storage unit 12 stores a plurality of images obtained by photographing a road from the sky by the UAV 3 flying at an almost constant altitude above the road. The UAV 3 flies at an altitude of 20 meters or less above the ground at the time of photographing, for example, at an altitude of 5 to 20 meters, preferably at an altitude of 5 to 15 meters.

Figure 2:
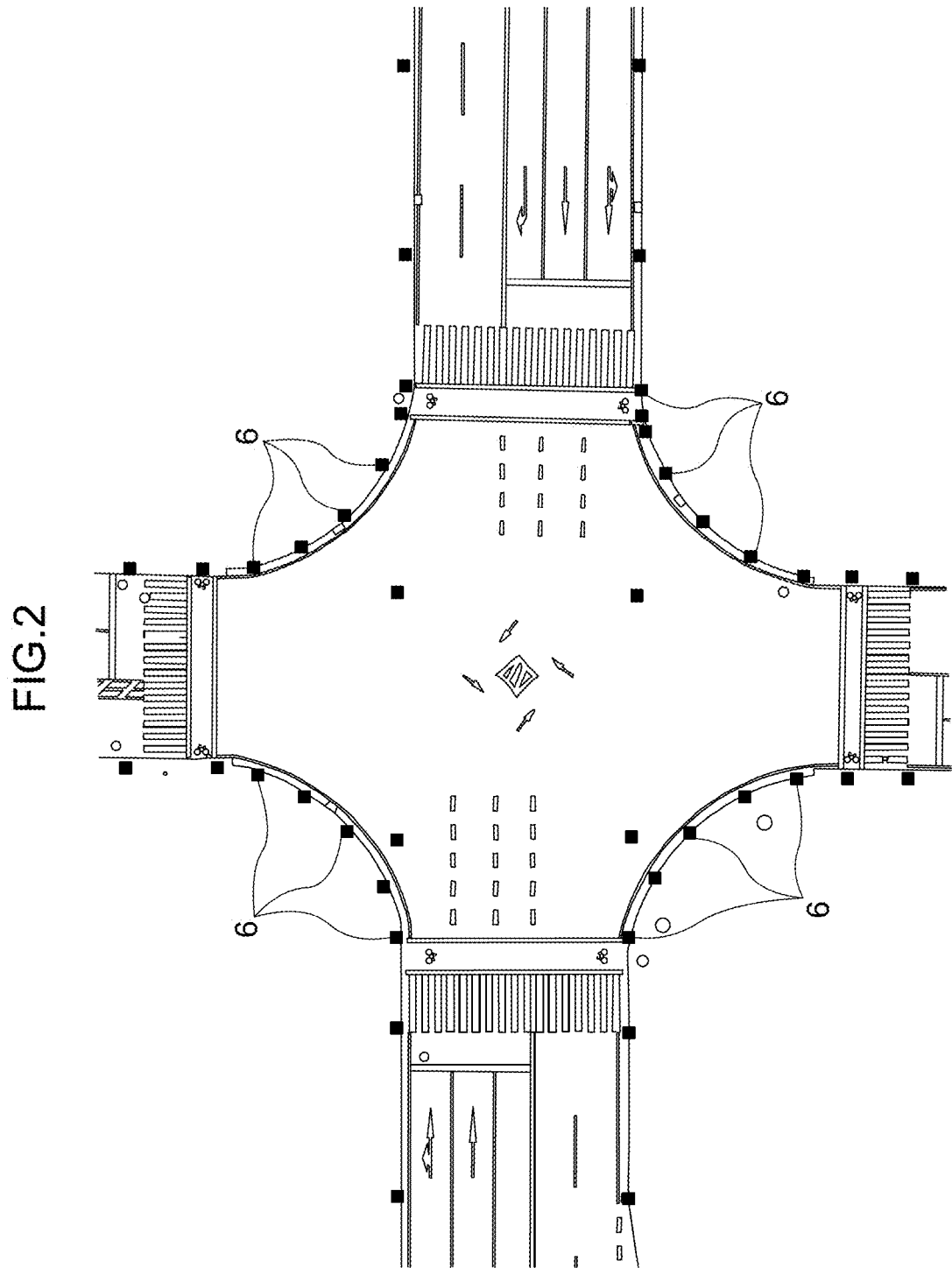
FIG. 2 is a diagram illustrating a state in which a plurality of survey markers are installed near both edges of a road when the road is photographed from the sky.

When the road is photographed from the sky by the UAV 3, a plurality of the survey markers 6 are installed as a plurality of feature points, for example, near both edges of the road, as illustrated in FIG. 2. The plurality of survey markers 6 are installed at intervals of, for example, 5 to 15 meters along the edges of the road (in the longitudinal direction of the road). The plurality of survey markers 6 are installed in consideration of connection of the plurality of photographed images photographed from the sky and creation of an ortho-image. Each survey marker 6 is a feature point, three-dimensional coordinates of which are to be provided, and is used as a rating point. In addition to the survey markers 6, feature points, which are included in the plurality of photographed images, and three-dimensional coordinates of which are not provided, may be used when the plurality of photographed images are connected to create an ortho-image.

Figure 3:
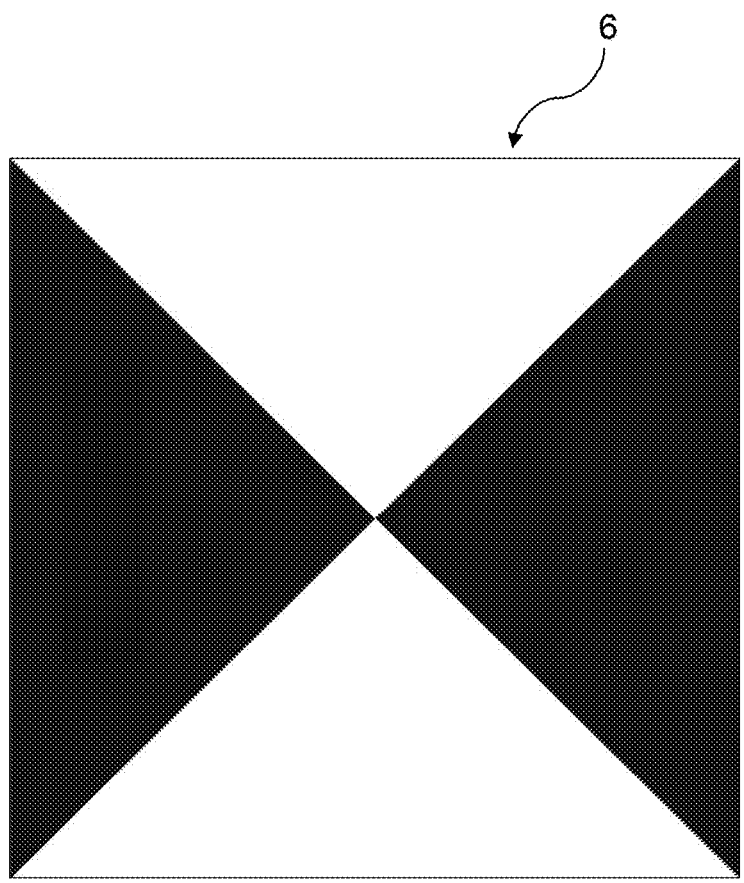
FIG. 3 is a diagram illustrating the survey marker.

Each survey marker 6 is a square plate-like member as illustrated in FIG. 3. The survey marker 6 is marked with a pattern that makes a center location clear. The survey marker 6 has a back surface formed with an adhesive layer, and is a seal-like marker attached with a backing paper so as to cover the adhesive layer, and can be easily fixed at an installation place by removing the backing paper and attaching the survey marker to the road. Therefore, when the survey marker 6 is used, the backing paper covering the adhesive layer is removed and the back surface of the survey marker 6 is attached to the road surface. The survey marker 6 of this embodiment is, for example, a square shape of 9 cm×9 cm, but the type, the shape, the size, the pattern, and the like of the survey marker 6 is not limited thereto.

Figure 4:
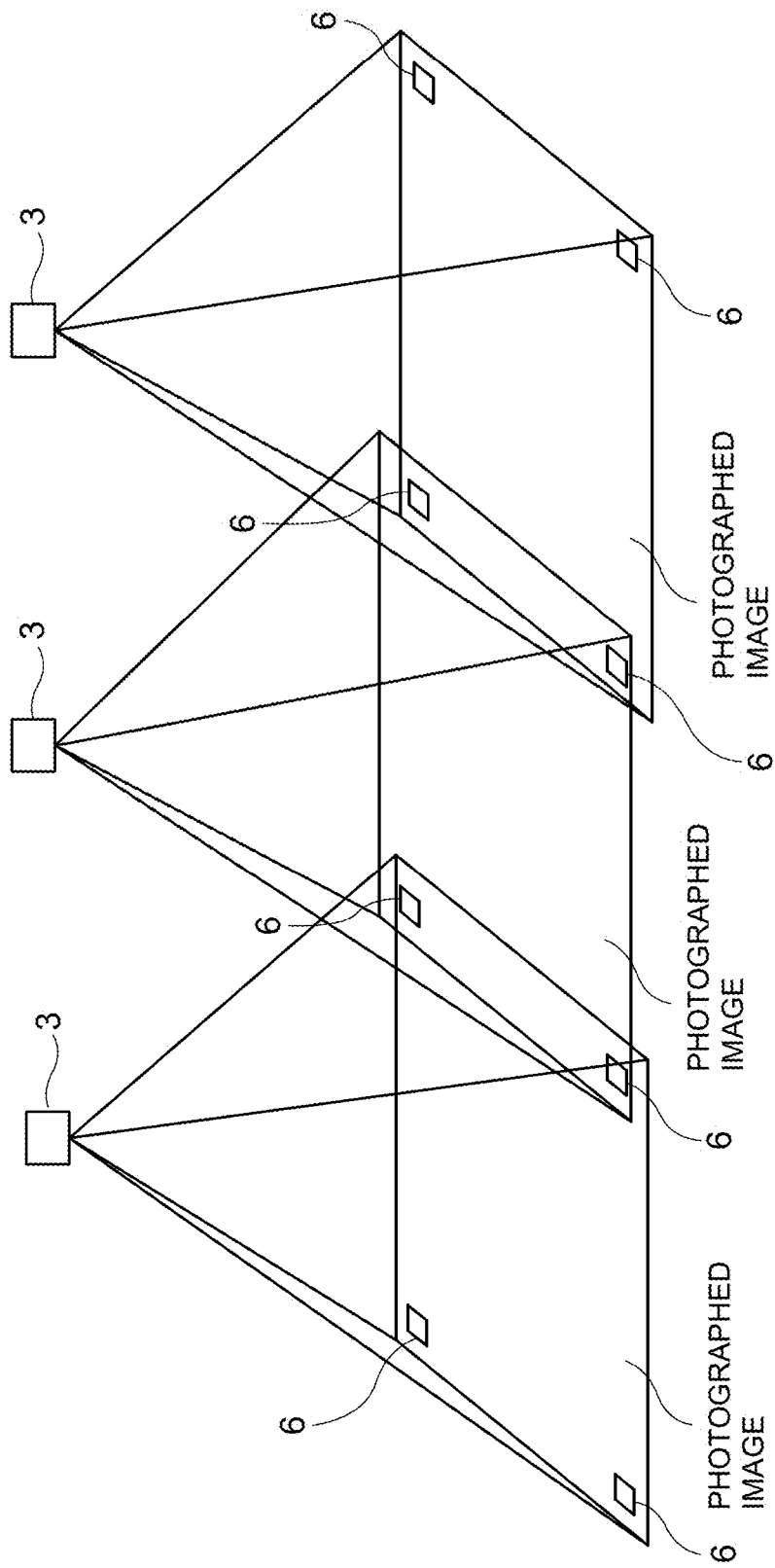
FIG. 4 is a diagram illustrating a state in which the survey markers are included in each two photographed images.

The plurality of images photographed by the UAV 3 are photographed in such a manner that each survey marker 6 is included in at least two of the photographed images, as illustrated in FIG. 4. Therefore, at least one common survey marker 6 is photographed in each two adjacent photographed images. Although FIG. 4 illustrates a case where the survey markers 6 are included in all of the photographed images, the plurality of images photographed by the UAV 3 may be photographed so as to include either the survey marker 6 or the feature point other than the survey marker 6 in at least two of the photographed images.

The ortho-image creation unit 13 creates an ortho-image on the basis of the three-dimensional coordinates of the survey markers 6 stored in the coordinate storage unit 11 and a plurality of the photographed images stored in the photographed image storage unit 12. Specifically, the ortho-image creation unit 13 creates an ortho-image by connecting two adjacent photographed images on the basis of the common survey marker 6 photographed in those photographed images by performing SfM (Structure from Motion) analysis or the like of the data of the plurality of photographed images. When there is a vehicle on a road in the photographed image to create an ortho-image, it is possible to create an ortho-image without the vehicle on the road by automatically recognizing the vehicle (by automatic image recognition) and replacing the area around the vehicle on the road with the image of the road without the vehicle in another photographed image.

The display control unit 14 displays, on the display unit 5, the ortho-image created by the ortho-image creation unit 13. A user can perform an operation to designate a predetermined position in the image displayed on the display unit 5 by pressing the display surface 5a of the display unit 5. For example, in a state where the ortho-image created by the ortho-image creation unit 13 is displayed on the display unit 5, the user can operate to designate a predetermined position by pressing the predetermined position in the ortho-image displayed on the display surface 5a of the display unit 5.

(Creation of Ortho-Image)

Figure 5:
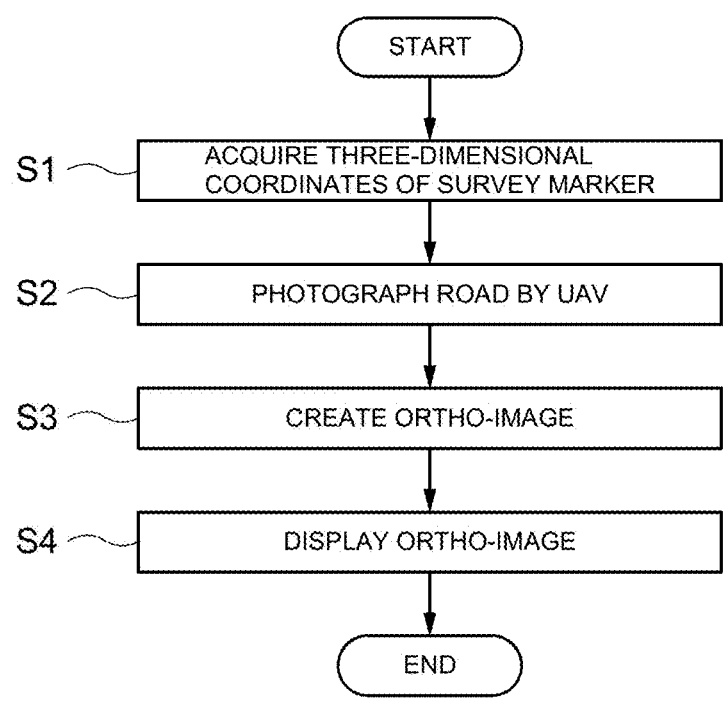
FIG. 5 is a chart illustrating a creation method for creating an ortho-image in an ortho-image creation apparatus.

The creation method for creating an ortho-image in the ortho-image creation apparatus 10 will be described with reference to FIG. 5.

In Step S1 (coordinate acquisition step), the total station 2 acquires three-dimensional coordinates, that is, plane positions (latitudes and longitudes) and elevations (heights) for a plurality of predetermined positions, that is, predetermined positions where the plurality of survey markers 6 are installed, in the periphery of a repair part where road repair is performed.

In Step S2 (photography step), the road is photographed from the sky by the UAV 3 flying at an altitude of 20 meters or less above the ground. When photographing is performed, a plurality of survey markers 6 are previously installed at a plurality of predetermined positions where measurement is performed in Step S1. Therefore, for the plurality of survey markers 6, a plurality of photographed images are photographed in such a manner that each survey marker 6 is included in at least two of the photographed images.

In Step S3 (ortho-image creation step), an ortho-image is created on the basis of the three-dimensional coordinates acquired by Step S1 and the plurality of photographed images photographed by Step S2.

Figure 6:
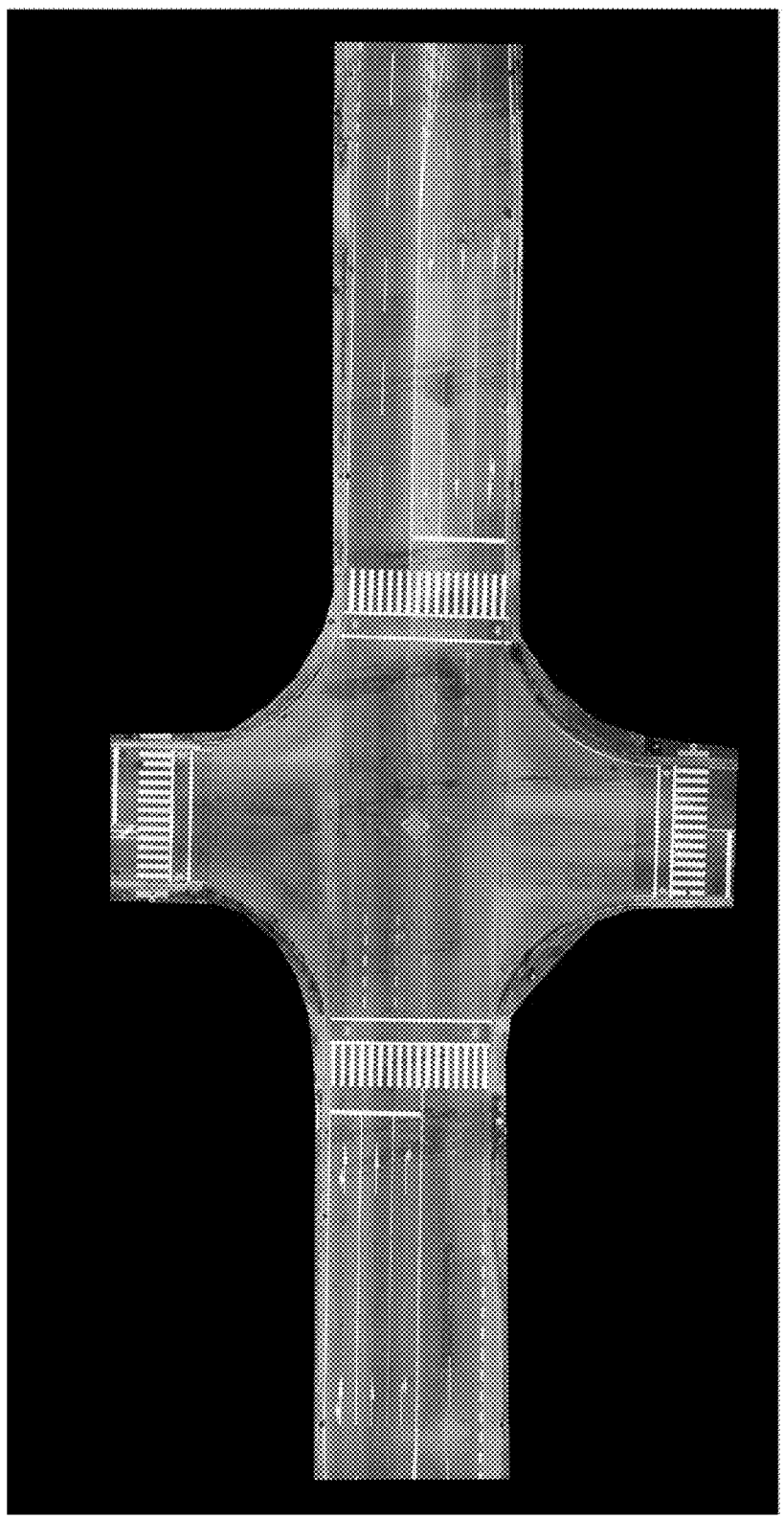
FIG. 6 is a view indicating a state in which an ortho-image is displayed in a display unit.

In Step S4 (display step), the ortho-image is displayed on the display unit 5 as illustrated in FIG. 6. In this embodiment, the ground pixel size of the ortho-image is 5 mm or less.

Figure 7:
FIG. 7 is an enlarged view of a road surface where cracks are formed.
Figure 8:
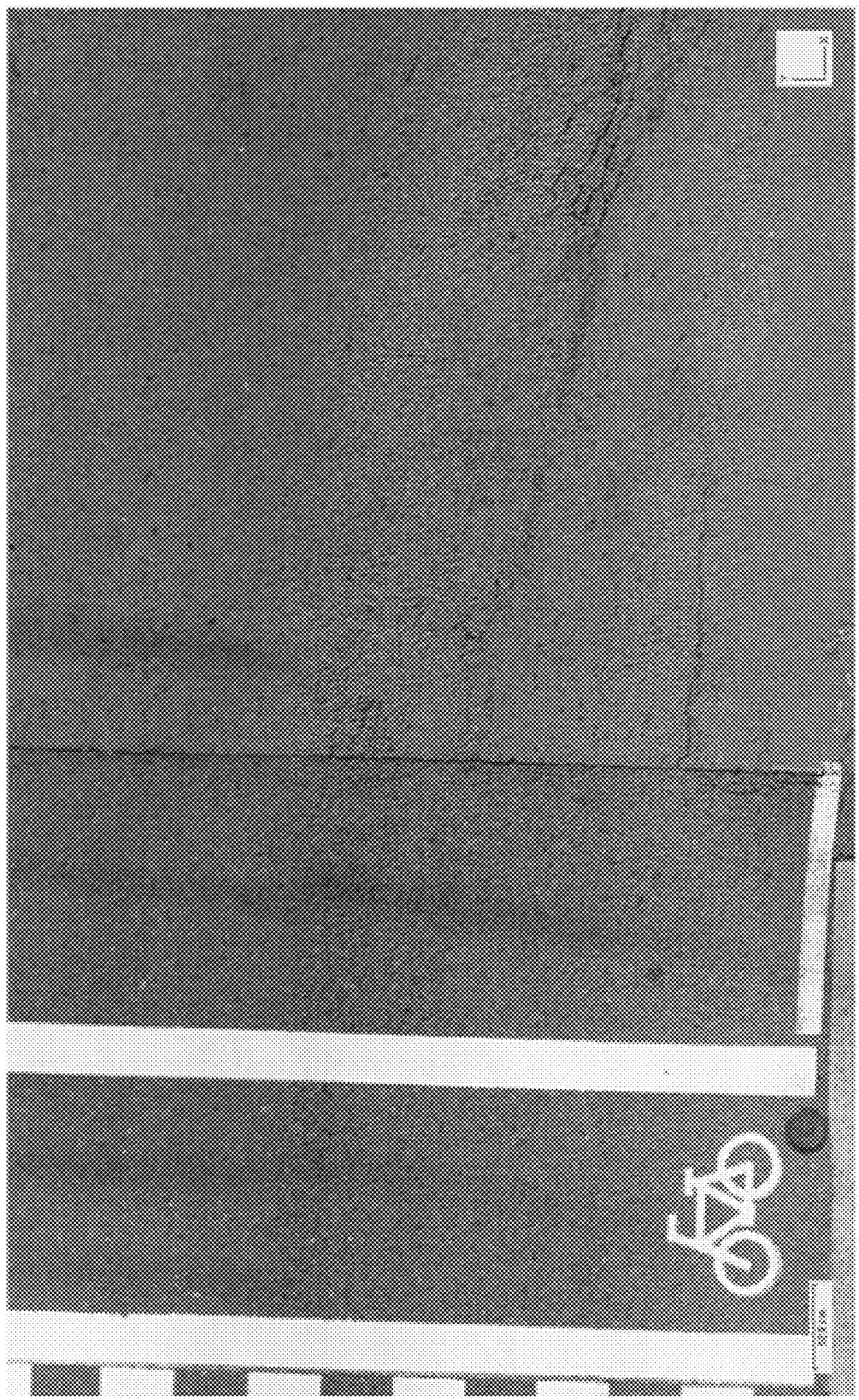
FIG. 8 is an enlarged view of a road surface where cracks are formed.
Figure 9:
FIG. 9 is an enlarged view of a road surface where cracks are formed.
Figure 10:
FIG. 10 is an enlarged view of a road surface with a manhole.

FIGS. 7 to 9 are enlarged views of a road surface where cracks are formed. FIG. 10 is an enlarged view of a road surface with a manhole. Thus, in the ortho-image created by the ortho-image creation apparatus 10 of this embodiment, it is possible to clearly distinguish cracks formed on the road surface and to clearly distinguish the type of manhole on the basis of the characters and symbols on the manhole cover.

Conventionally, when a special road surface condition survey vehicle is used to survey the cracking condition on the road surface, it is possible to detect cracks of approximately 1 mm in width formed on the road surface. Therefore, an evaluation has been conducted as to whether the ortho-image created by the present invention can detect cracks of approximately 1 mm width formed on a road surface as well as a special road surface condition survey vehicle.

Figure 11:
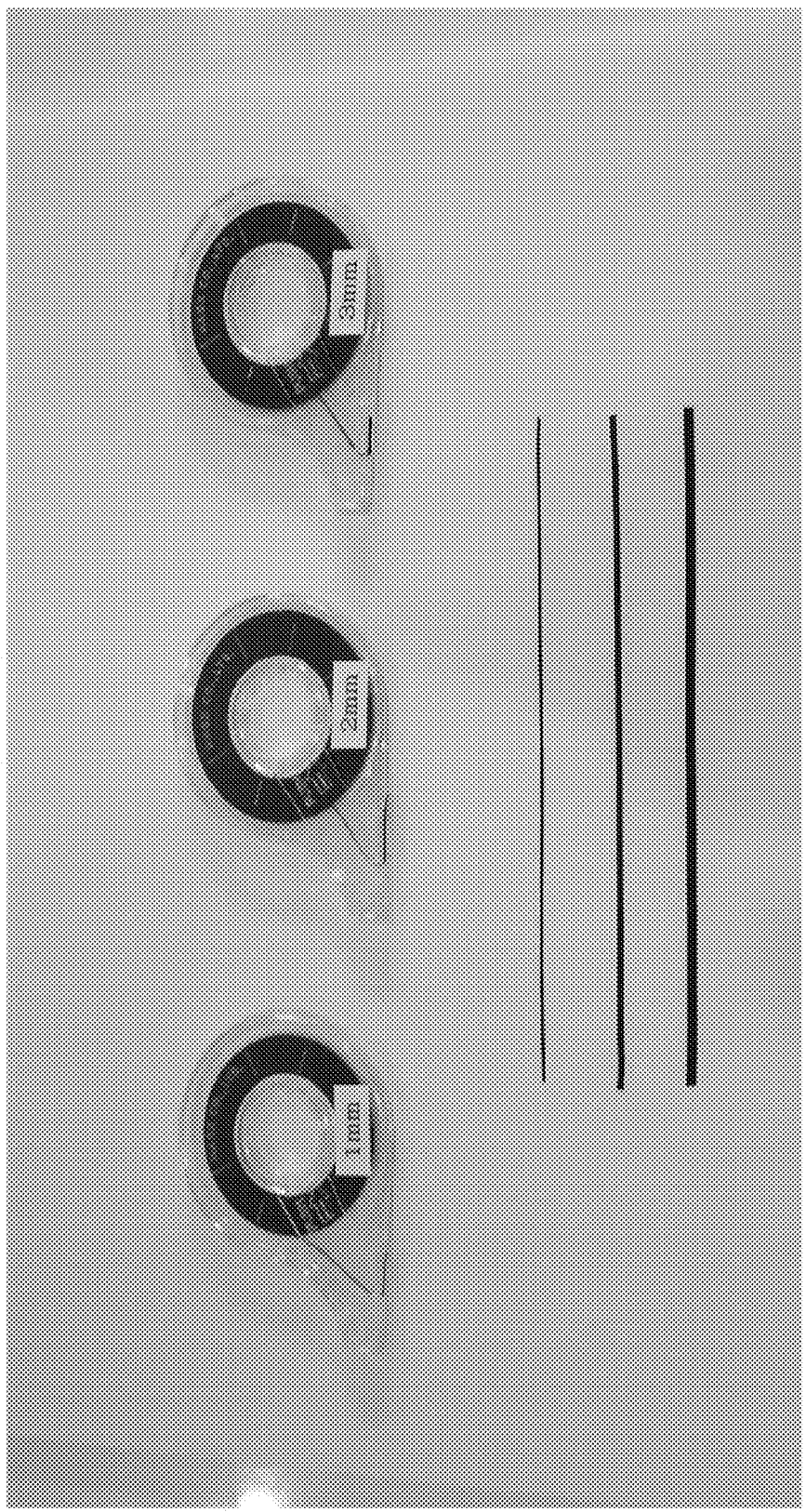
FIG. 11 is a view illustrating a tape used for the detection evaluation of a crack formed on the road surface.
Figure 12:
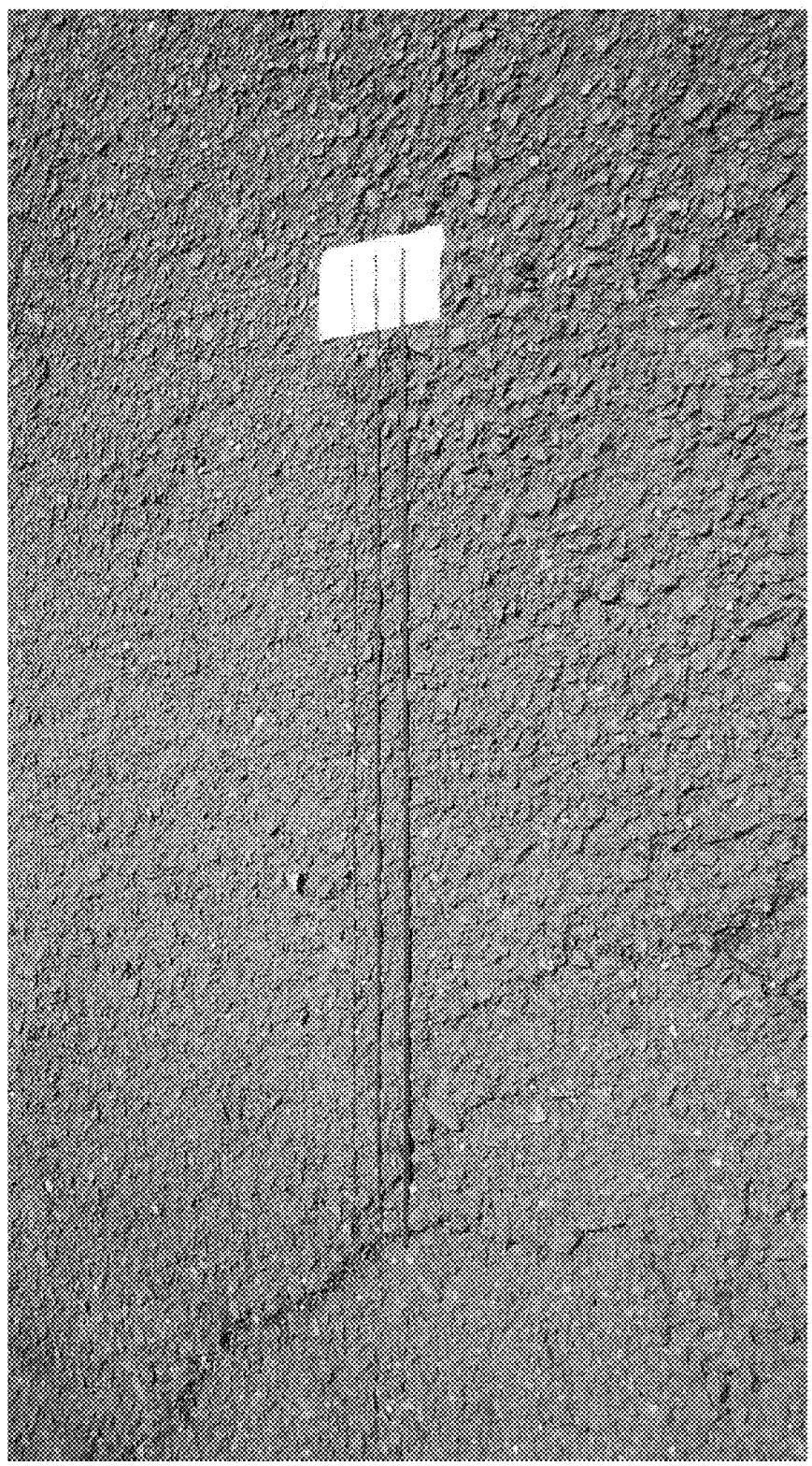
FIG. 12 is a view indicating a state in which the tape of FIG. 11 has been attached to the road surface.

For the above evaluation, as illustrated in FIGS. 11 and 12, 1 mm, 2 mm and 3 mm wide cracks formed on a road surface were simulated with the use of 1 mm, 2 mm and 3 mm wide tapes and applying the tapes on the road surface. The road where the simulated cracks were formed was then photographed from the sky by a UAV 3 flying at an altitude of less than 20 meters above the ground to create an ortho-image.

Figure 13:
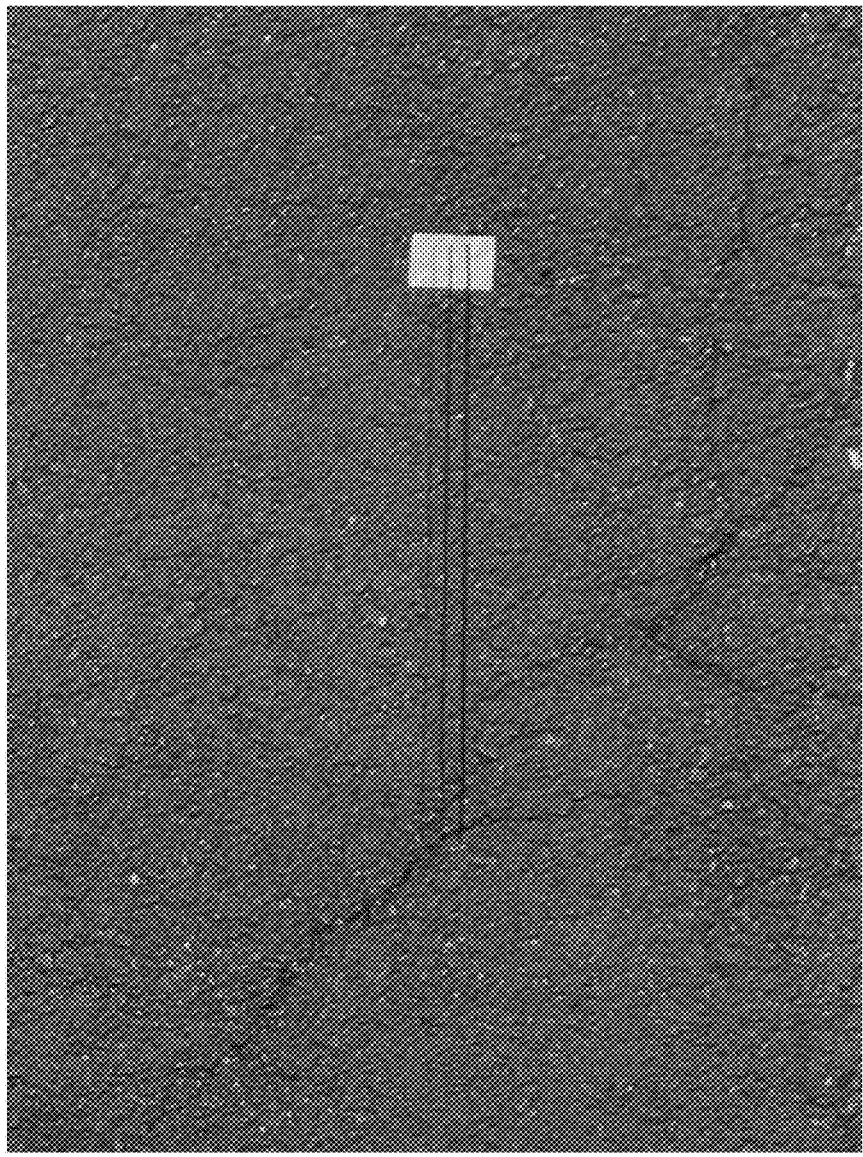
FIG. 13 is a view indicating the ortho-image of the road surface of FIG. 12.

FIG. 13 is an ortho-image of a road with simulated cracks. It was found that the ortho-images created by the present invention can detect all the simulated cracks of 1 mm, 2 mm and 3 mm widths formed on the road surface. Consequently, the ortho-image created by the present invention can detect cracks of approximately 1 mm width formed on the road surface.

Road Survey Method Using Ortho-image

The ortho-image created by the ortho-image creation apparatus 10 as described above is used for various surveys that are conducted when a road is repaired.

In the present embodiment, a road survey method will be described, in which the ortho-image created by the ortho-image creation apparatus 10 is used to (1) survey a cracking (crack) condition of a road surface, (2) survey the locations of plane elements around a road including an area to be repaired, (3) survey for repairing the periphery of a manhole, (4) survey a distance between two designated points on a road surface, and (5) survey a planar dimension in a designated range of a road surface.

(Road Survey Method 1)

Figure 14:
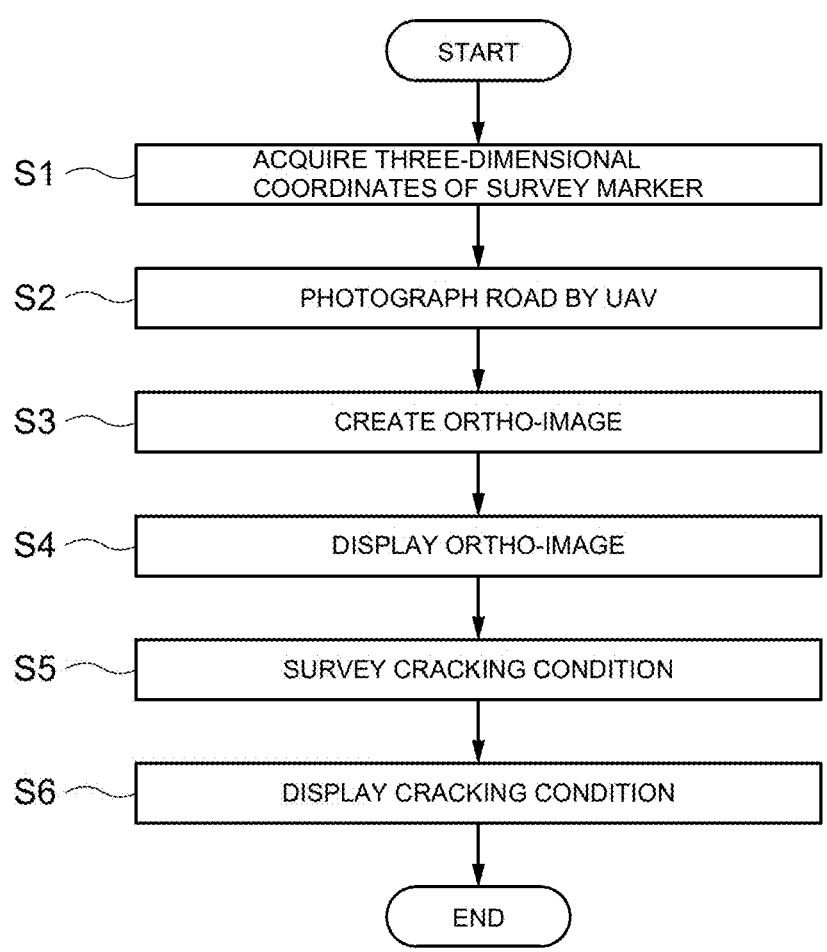
FIG. 14 is a chart illustrating a survey method for the cracking condition of a road surface.

A survey method for the cracking condition of a road surface will be described with reference to FIG. 14.

In a survey on the cracking condition of a road surface, surveys as to a place where cracks are formed on the road surface including a repair part where road repair is to be performed, and how much a cracking rate and a patching rate of the place are performed.

After the ortho-image is displayed by the above-mentioned Steps S1 to S4, in Step S5, the survey on the cracking condition of the road surface is conducted on the basis of the ortho-image displayed on the display unit 5. Specifically, the survey area in the road displayed on the display unit 5 is divided into a plurality of survey ranges, and the cracking rate and the patching rate of the road surface are surveyed for each of the survey ranges.

Figure 15:
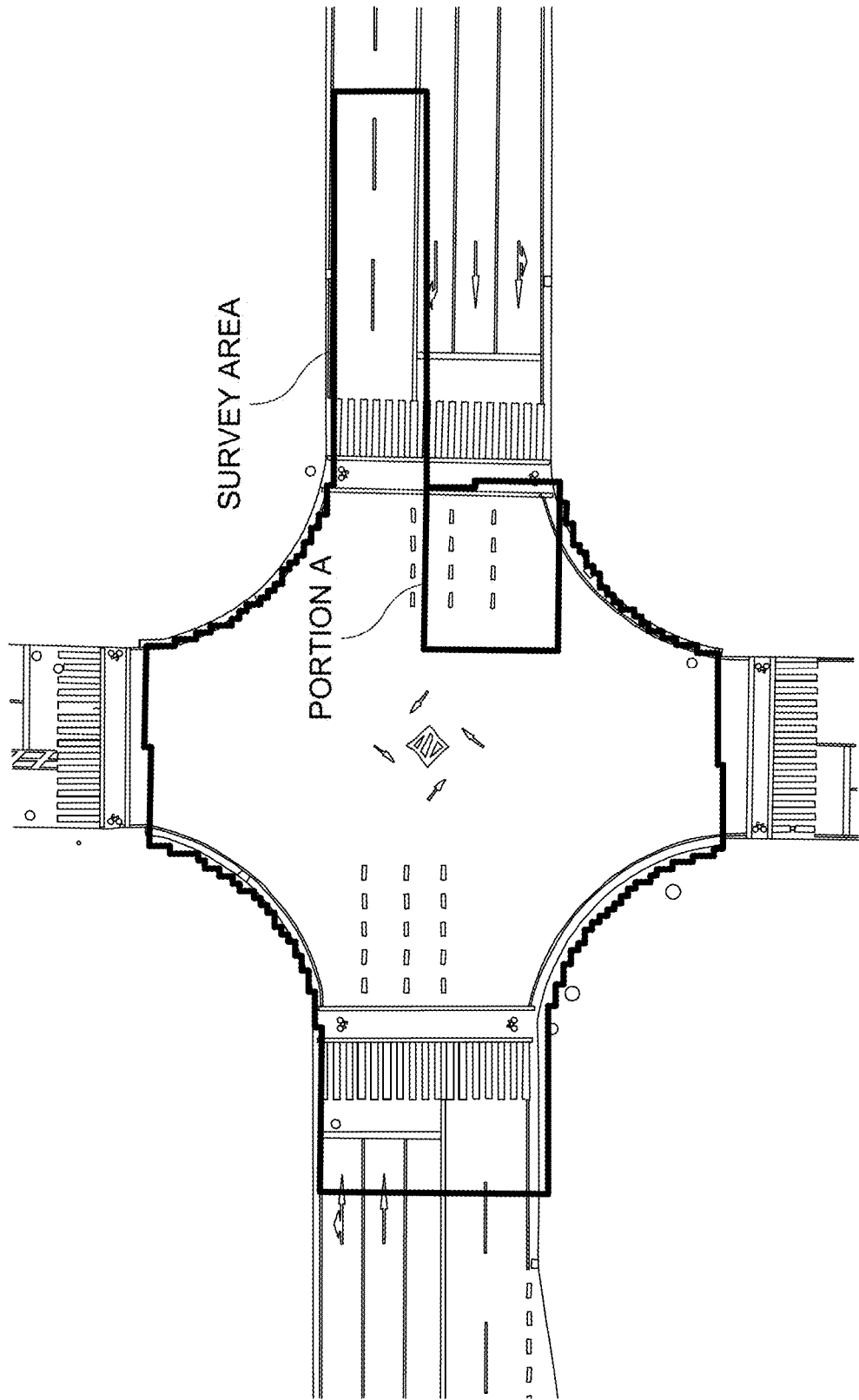
FIG. 15 is a diagram illustrating a survey area in the ortho-image displayed on the display unit.

In FIG. 15, the survey area in the ortho-image displayed on the display unit 5 is illustrated. In this embodiment, the survey area is divided into 50 cm×50 cm survey ranges, and the survey on the cracking rate and the survey on the patching rate are conducted as the survey on the cracking condition in each survey range. In this embodiment, a survey on the amount of cracks (quantity of cracks) for each survey range is conducted as a survey on the cracking rate.

Figure 16:
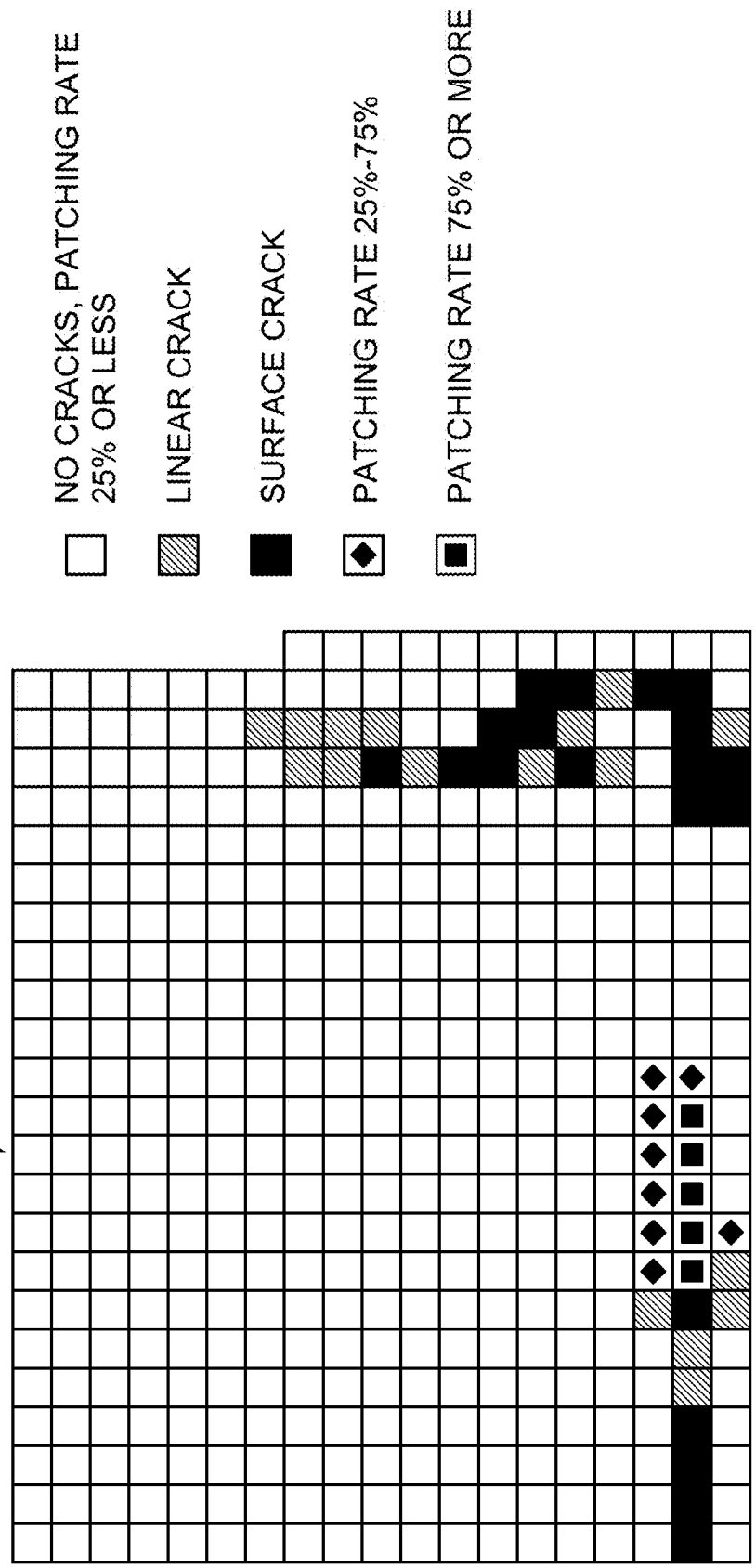
FIG. 16 is an enlarged view of a portion A in the survey area illustrated in FIG. 15.

FIG. 16 is an enlarged view of portion A in the survey area illustrated in FIG. 15, which is divided into a plurality of survey ranges. In FIG. 16, the following conditions are distinguished and illustrated for each survey range: no cracks and patching rate of 25% or less, linear cracking condition (one crack), surface cracking condition (two or more cracks), patching rate of 25-75%, and patching rate of 75% or more. FIG. 16 distinguishes the road surface condition for each survey area by different patterns, but the road surface condition for each survey range may be distinguished and displayed by different colors.

Figure 17:
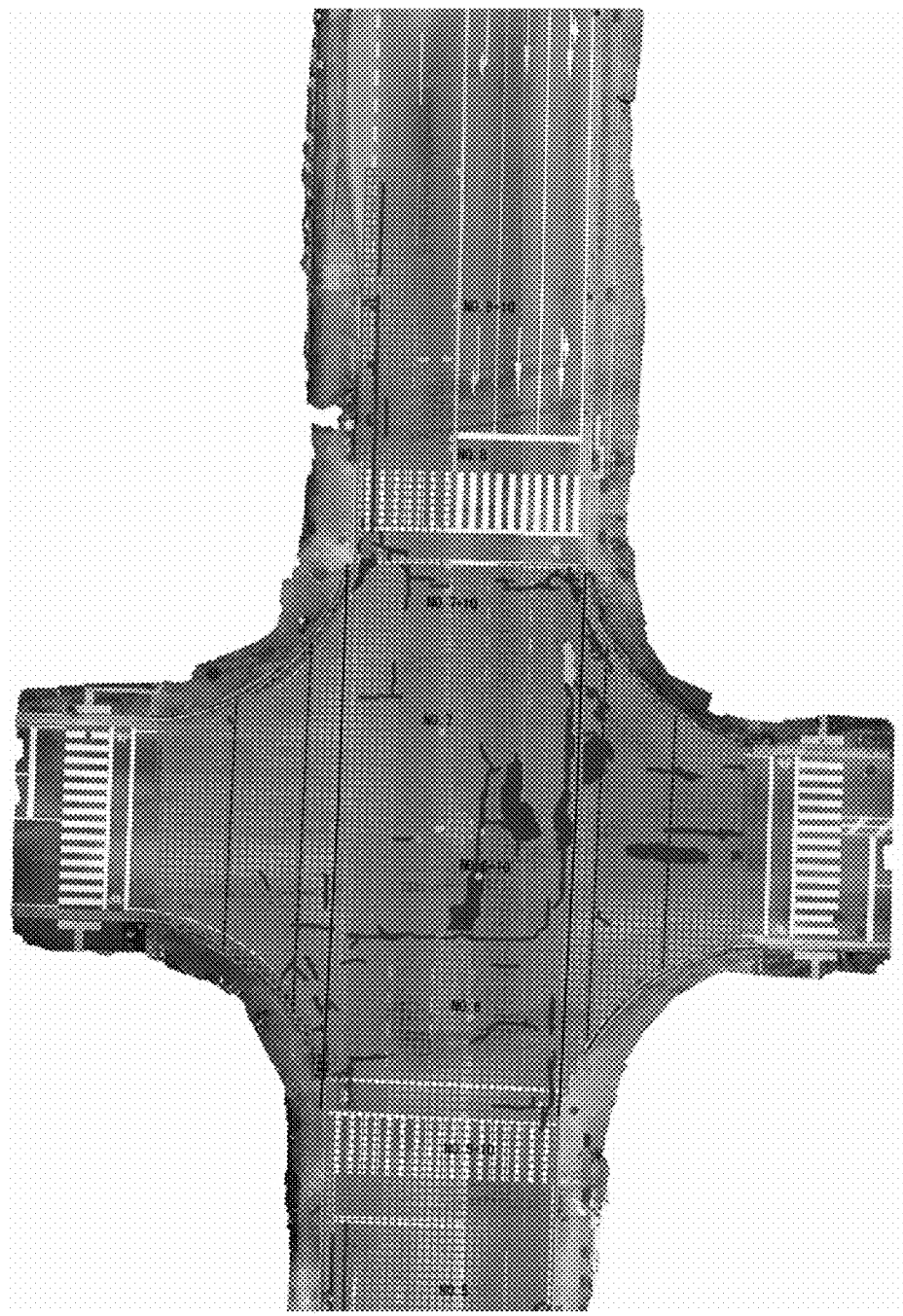
FIG. 17 is a view indicating a result of having surveyed the condition of a road surface for each survey range of a whole survey area.

In Step S6 (road condition display step), as illustrated in FIG. 17, the results of the survey on the cracking condition of the road surface for each survey range in the entire survey area are displayed on the display unit 5. In FIG. 17, the survey ranges of the linear cracking condition, the surface cracking condition, the patching rate of 25-75%, and the patching rate of 75% or more may be distinguished, for example, by different colors. In addition, the survey ranges of the linear cracking condition and the surface cracking condition and the survey ranges of the patching rate of 25-75% and the patching rate of 75% or more may be distinguished, for example, by different colors.

(Road Survey Method 2)

Figure 18:
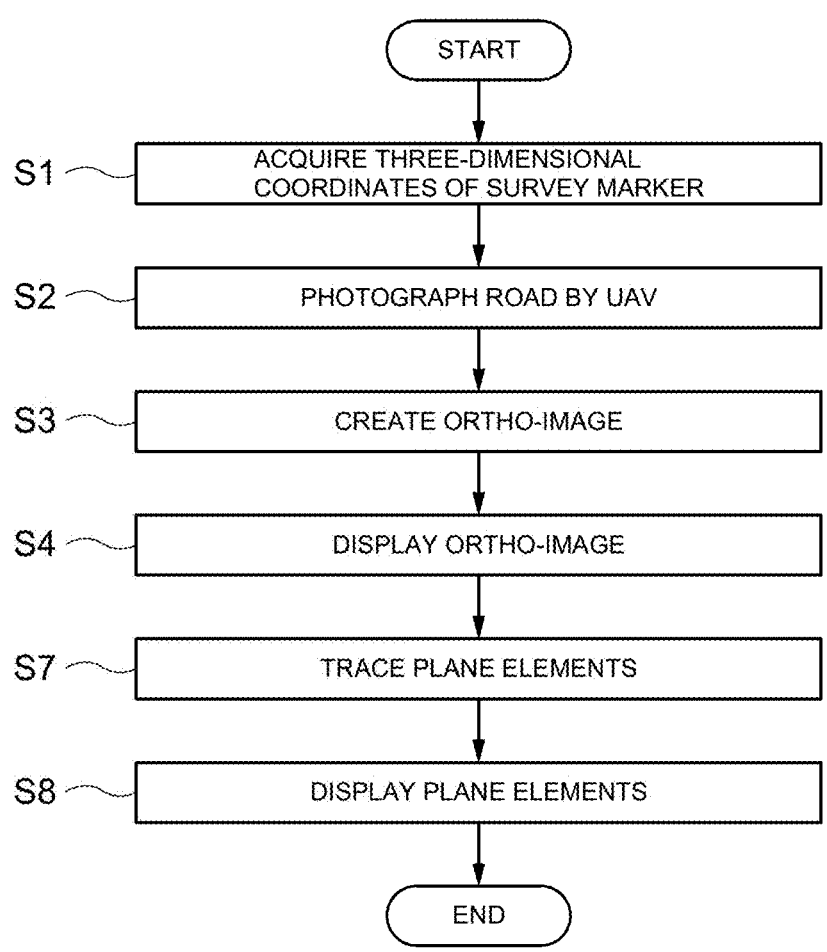
FIG. 18 is a chart illustrating a survey method for a location of a plane element around a road.

A survey method for the locations of plane elements around a road will be described with reference to FIG. 18.

In the survey on the locations of plane elements around a road, the locations of plane elements are surveyed, including the edge of the road including a repair part where the road repair is to be performed, the road deformation, division lines such as portions painted in white on the road surface indicating a lane marking, and lines indicating the location of manholes, and the like.

After the ortho-image is created by the above-mentioned Steps S1 to S4, in Step S8 (plane element illustration step), the plane elements around a road are traced manually or automatically (auto-tracing process) on the basis of the ortho-image displayed on the display unit 5. Specifically, in the road displayed on the display unit 5, the plane elements including, for example, the edge of the road, the road deformation, division lines such as portions painted in white on the road surface indicating a lane marking, and lines indicating the location of manholes, are traced.

Figure 19:
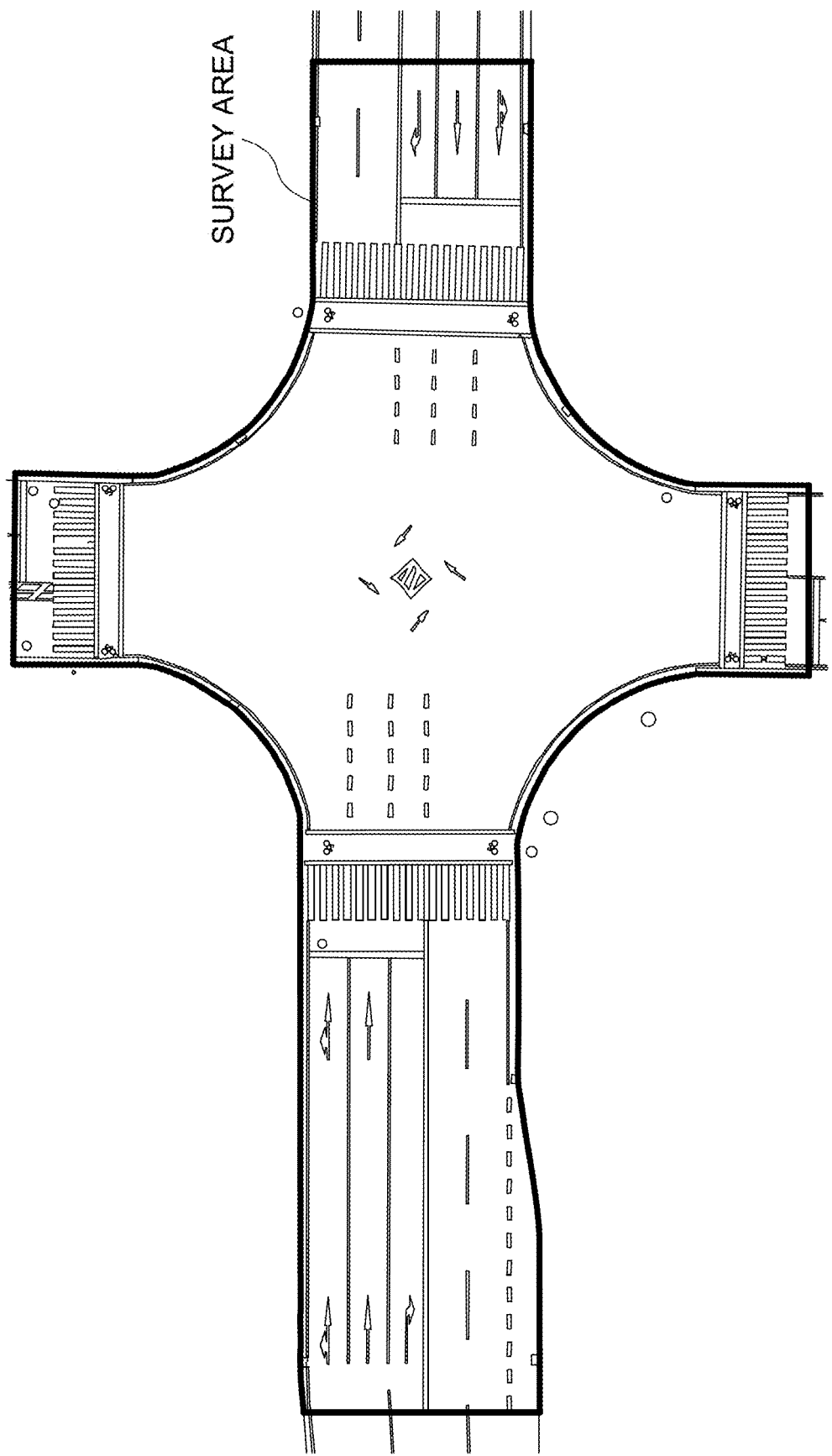
FIG. 19 is a diagram illustrating a survey area in the ortho-image displayed on the display unit.
Figure 20:
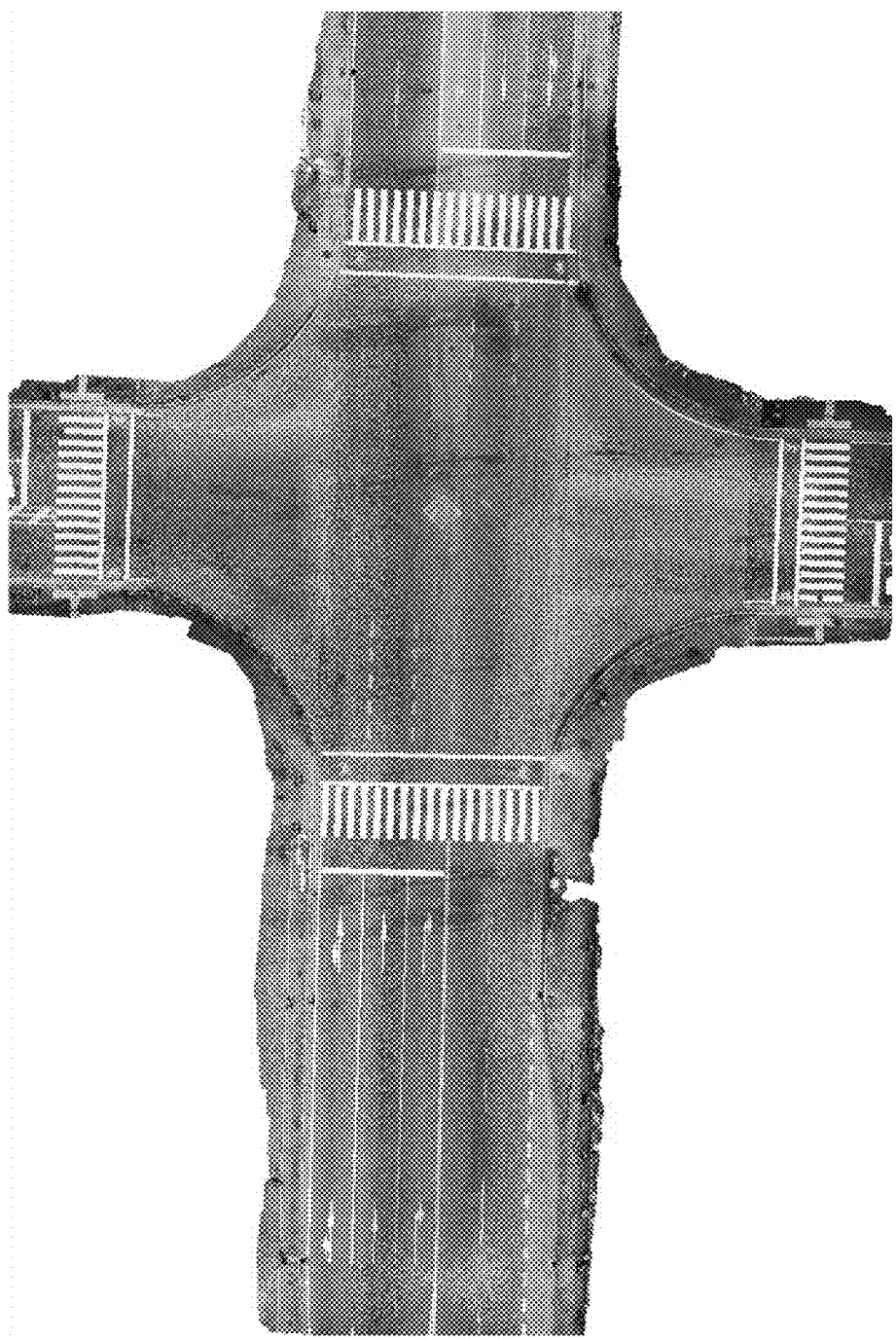
FIG. 20 is an ortho-CAD plan view of the ortho-image.
Figure 21:
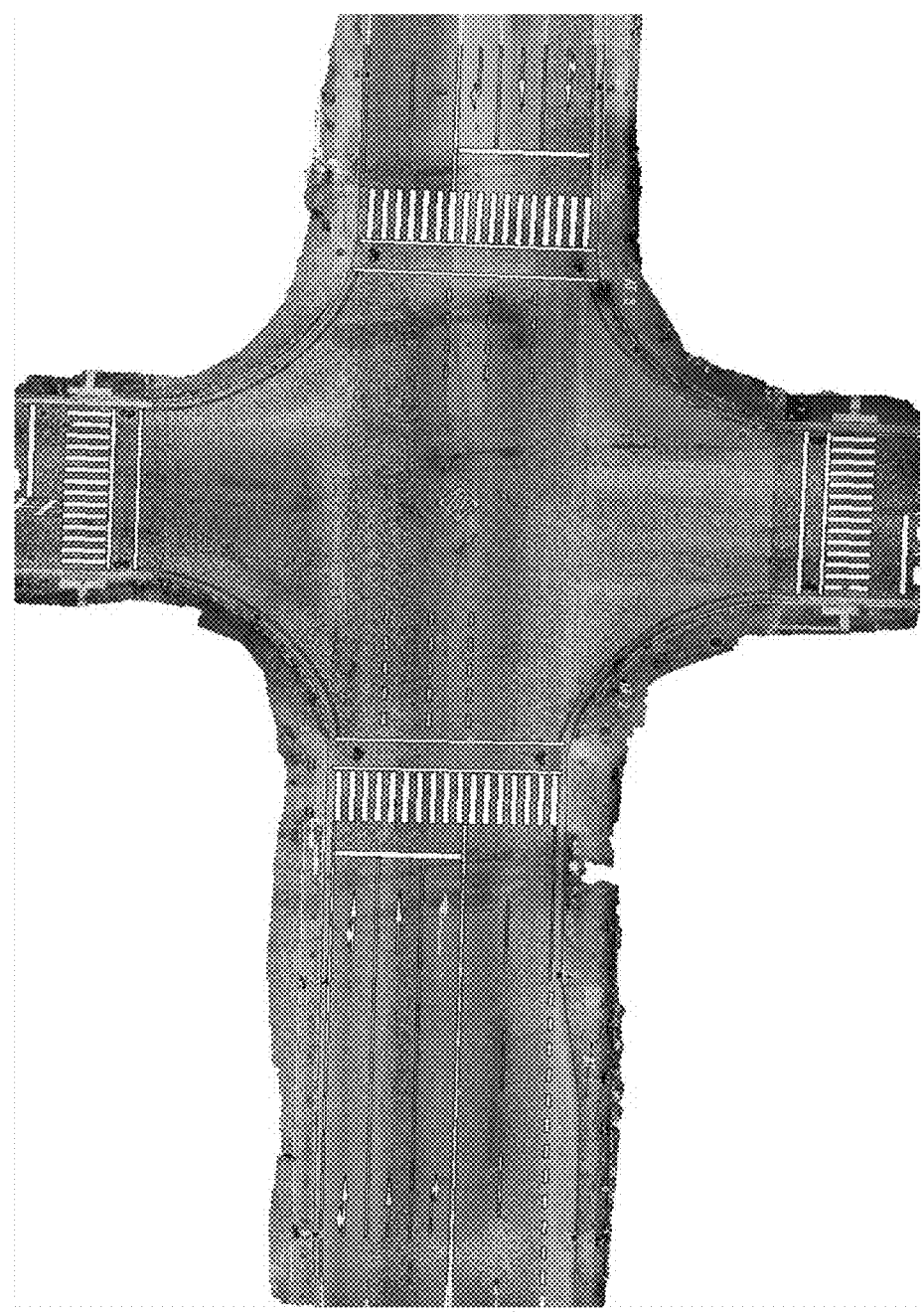
FIG. 21 is the ortho-CAD plan view of FIG. 20, in which the plane elements around a road are traced.

In FIG. 19, the survey area in the ortho-image displayed on the display unit 5 is illustrated. FIG. 20 is the ortho-CAD plan view of the ortho-image illustrated in FIG. 6, and FIG. 21 indicates a view obtained by tracing the plane elements around the road for the ortho-CAD plan view of FIG. 20. The ortho-CAD plan view is a plan view of ortho-image converted to 2DCAD. Therefore, in FIG. 21, lines and the like indicating the locations of the plane elements around the road have been added to the ortho-CAD plan view corresponding to the ortho-image of FIG. 20.

Figure 22:
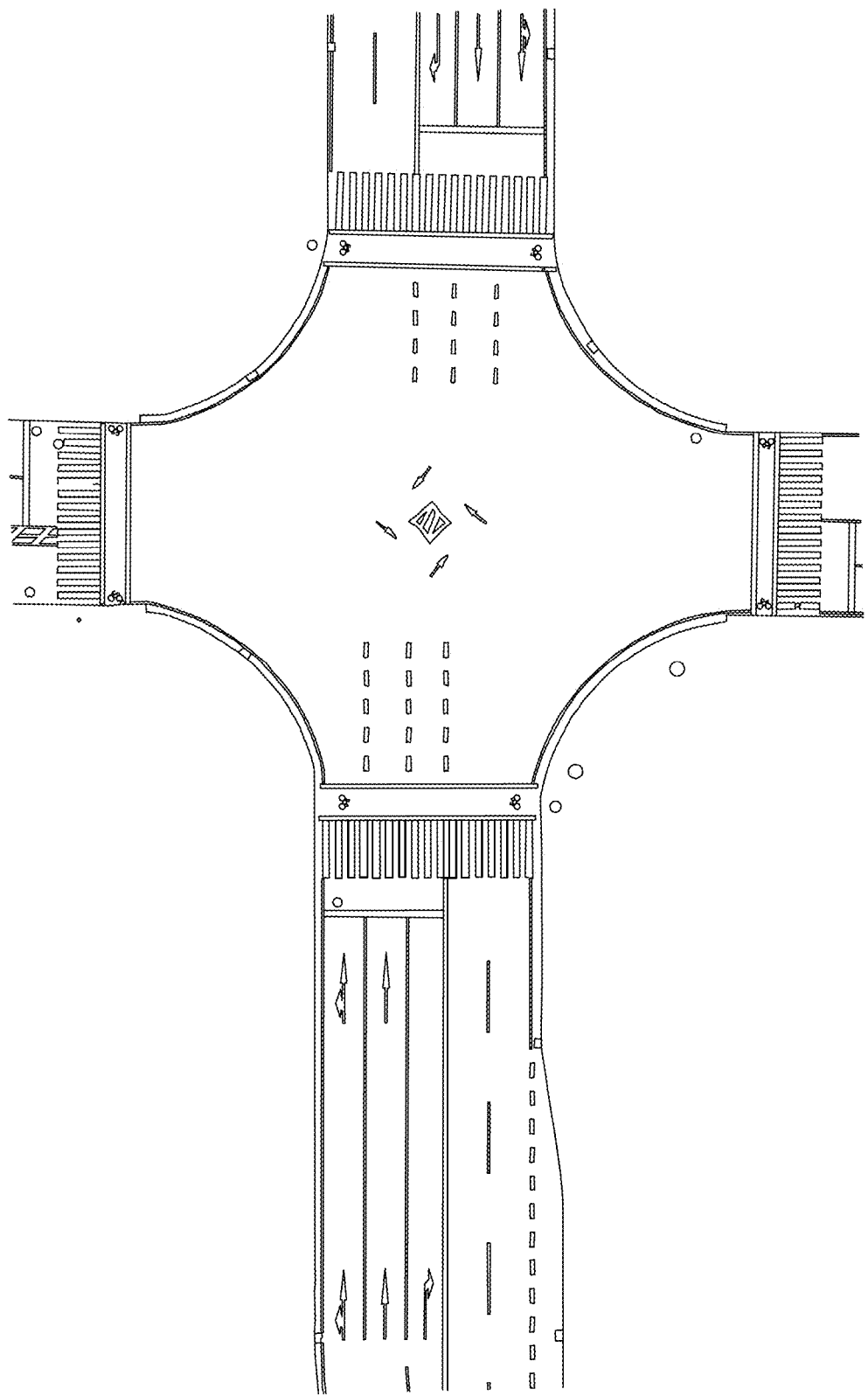
FIG. 22 is a diagram in which the plane elements of the entire survey range are illustrated.

In Step S8, as illustrated in FIG. 22, the plane elements around the road are traced in the entire survey range, and the illustrated plane elements are displayed on the display unit 5.

(Road Survey Method 3)

Figure 23:
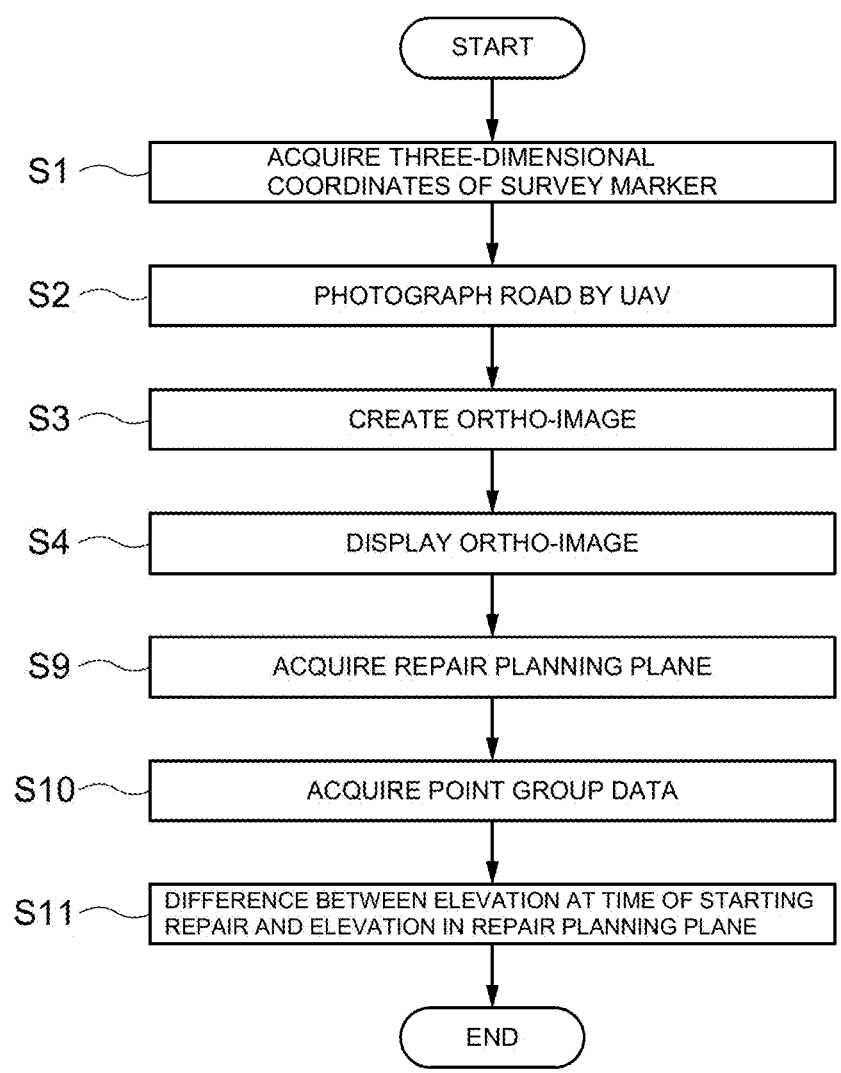
FIG. 23 is a chart illustrating a survey method for repairing the area around a manhole.

A survey method for repairing the periphery of a manhole will be described with reference to FIG. 23.

In the survey for repairing the periphery of a manhole, a height at which the elevation of the area around the manhole is to be adjusted to match the elevation of a repair planning plane in the road repair (adjustment height) is surveyed. Therefore, the adjustment height of the periphery of a manhole is the difference in elevation between the elevation of the periphery of the manhole at the time of starting the repair and the elevation of the repair planning plane. As the adjustment height of the periphery of a manhole, the difference in elevation between the two points upstream and downstream of the manhole in the longitudinal direction and the difference in elevation between the two points upstream and downstream of the manhole in the transverse direction is surveyed.

Figure 24:
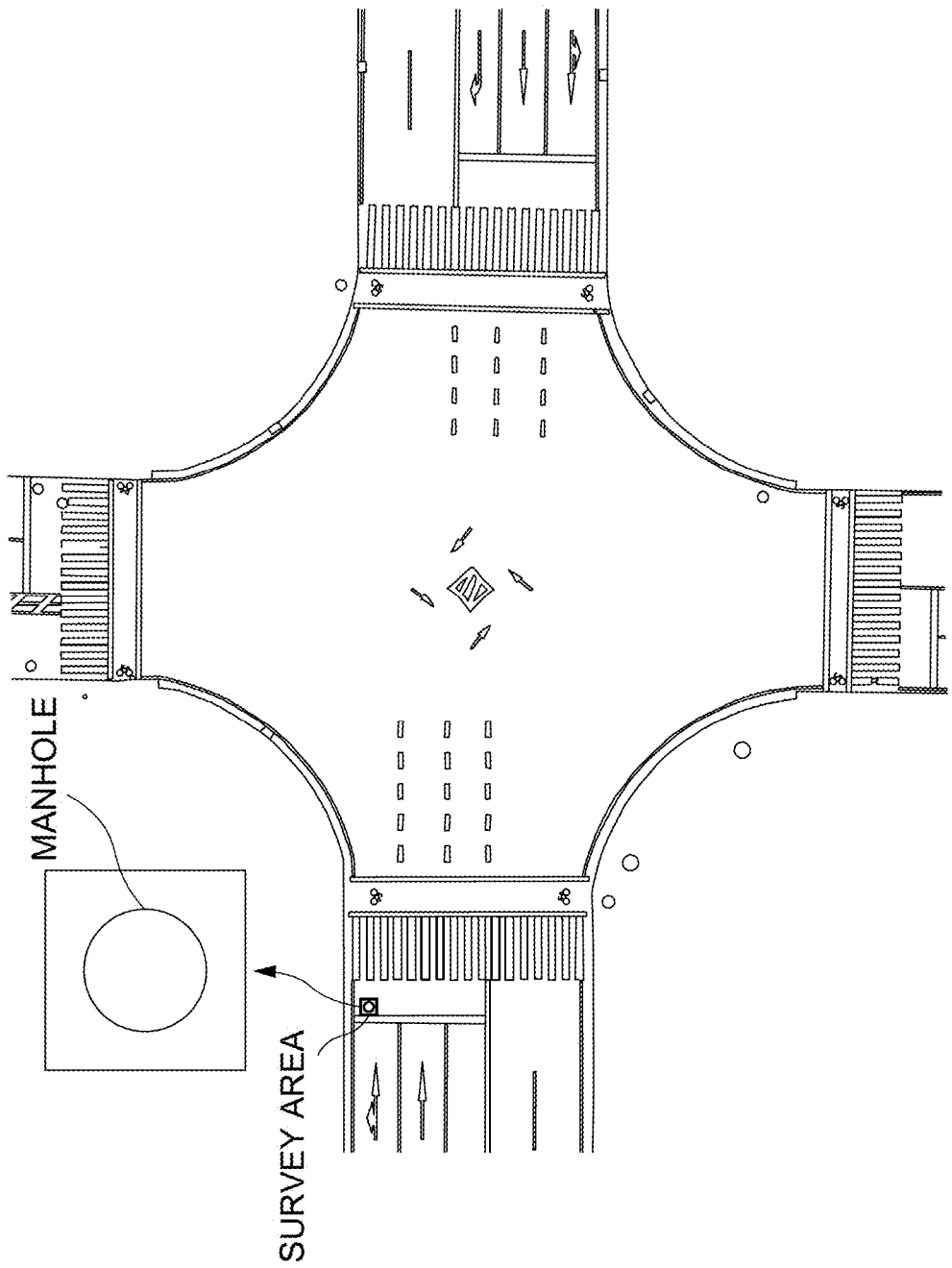
FIG. 24 is a diagram illustrating a survey area in the ortho-image displayed on the display unit.

In FIG. 24, the survey area in the ortho-image displayed on the display unit 5 is illustrated. The survey area in FIG. 24 includes one manhole and is the periphery of the manhole.

After the ortho-image is displayed by Steps S1 to S4 described above, in Step S9, the longitudinal and transverse planning is performed to obtain the planning plane data indicating the repair planning plane for repairing the road.

The repair planning includes longitudinal and transverse planning, and after the longitudinal planning along the longitudinal direction of the road is performed, the transverse planning along the transverse direction at multiple places of the road is performed to obtain the repair planning plane to be used for the repair. Therefore, the repair planning plane includes the planning plane data indicating the longitudinal planning plane and the planning plane data indicating the plurality of transverse planning planes.

Figure 25:
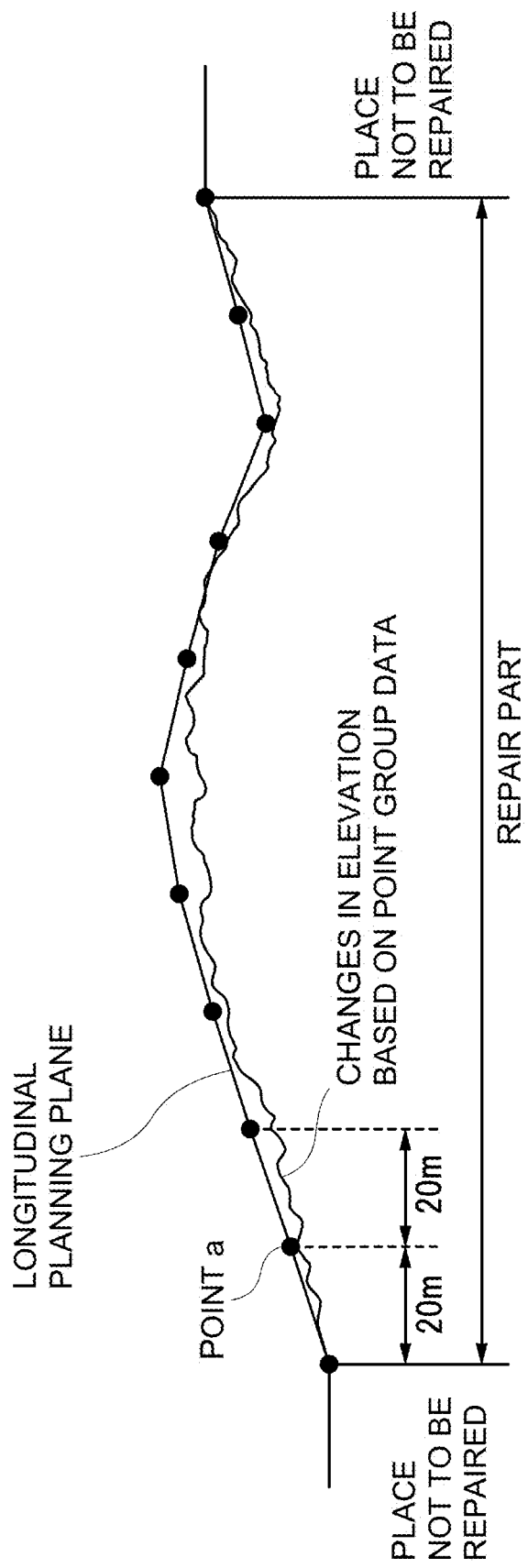
FIG. 25 is a schematic diagram illustrating a longitudinal planning plane.

The longitudinal planning includes a planning for the elevation of each point on the line along the longitudinal direction of the road in the center of the road. For example, FIG. 25 illustrates a longitudinal planning plane for the elevation of each point on the line along the center of the road. In FIG. 25, the repair part that requires a repair planning is between the place on the left that will not be repaired and the place on the right that will be repaired. The change in elevation based on the point group data is illustrated at the repair part in FIG. 25, as well as the longitudinal planning plane.

The longitudinal planning plane illustrated in FIG. 25 is obtained by planning the elevations at each location on the line along the center of the road, taking into account the flatness of the road, and then connecting those elevations. The locations on the line along the center of the road are, for example, every 10 m or every 20 m.

Figure 26:
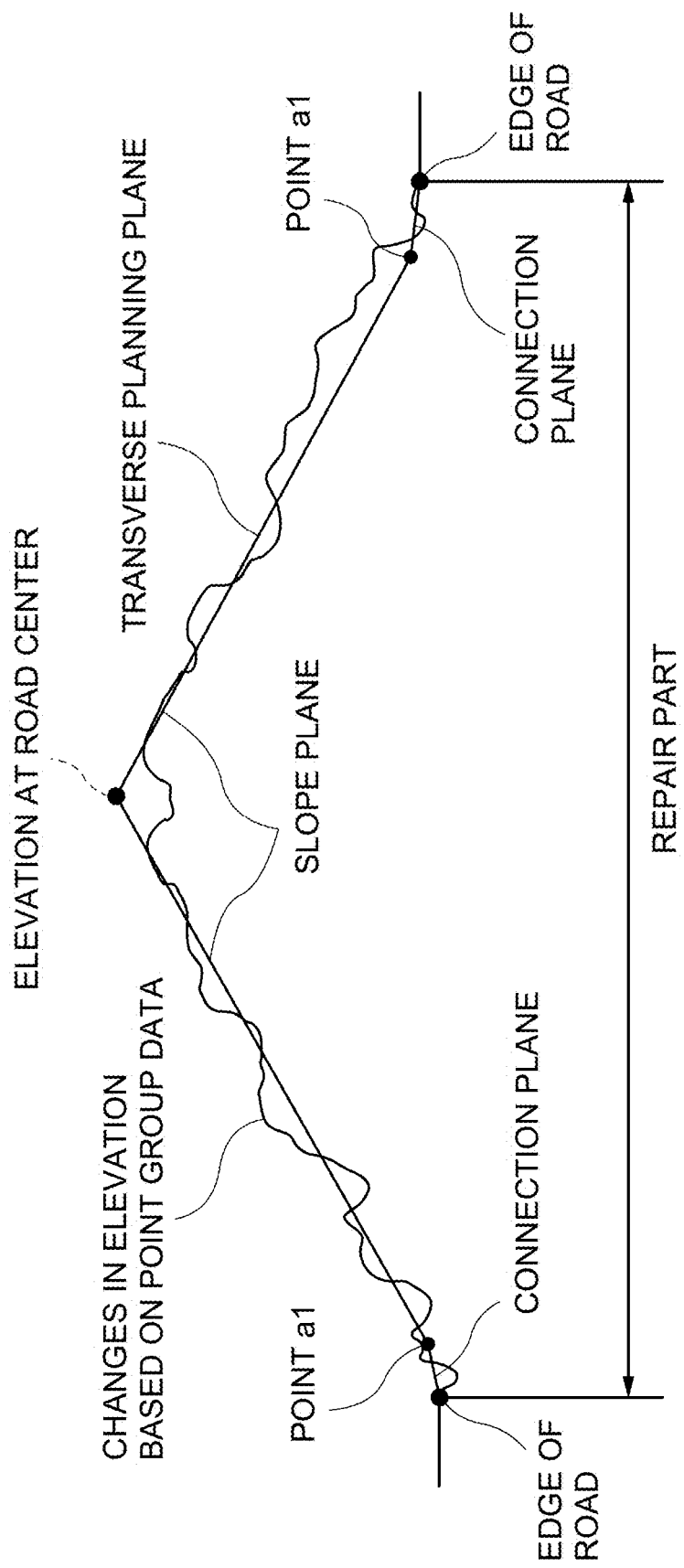
FIG. 26 is a schematic diagram illustrating a transverse planning plane.

In the longitudinal planning, the elevations at each location on the line along the center of the road are planned, and then the transverse planning is performed. The transverse planning is a planning for the elevation of each point on the line along the transverse direction of the road at each position on the line along the center of the road. For example, FIG. 26 illustrates the transverse planning plane for the elevation of each point on the line along the transverse direction of the road at point a in FIG. 25. In FIG. 26, the repair part that requires a repair planning is between the left edge of the road and the right edge of the road. The change in elevation based on the point group data is illustrated at the repair part and the transverse planning plane is illustrated. In FIG. 26, the slope of the road is illustrated in an easy-to-understand manner.

The transverse planning plane is obtained by planning for each position on the line along the center of the road illustrated in FIG. 25, taking into account the slope angle of the slope plane from the elevation of the center of the road downward to the both edges of the road. For example, when performing a transverse planning of a road, the road is usually designed to slope downward at a predetermined slope angle from the center of the road to the edge of the road.

For example, in the transverse planning plane of FIG. 26, the elevation decreases from the elevation of the center of the road at point a in the longitudinal planning plane of FIG. 25 to point a1 along a slope plane that slopes downward at a predetermined slope angle toward both edges of the road, and then the elevation decreases to the left edge of the road and the right edge of the road along a connection plane that connects point a1 to the left edge of the road and the right edge of the road. Therefore, when repaired on the basis of the transverse planning plane, the surface layer of asphalt pavement formed at the repaired point and the concrete sections at the left edge of the road and the right edge of the road will be connected without steps. The transverse planning plane in FIG. 26 is an example of a transverse planning plane, and the method of transverse planning plane is not limited thereto. Thus, the transverse planning plane may be designed, for example, to connect slope planes that slope downward at a plurality of different slope angles from the center of the road to the edges of the road.

By connecting the transverse planning planes at each position on the line along the center of the road obtained as described above in the longitudinal direction, the repair planning planes for repairing the road surface are obtained.

In Step S10 (point group data acquisition step), the point group data of each point in the road surface is acquired by the 3D scanner 4. The point group data acquired by the 3D scanner 4 is converted into a three-dimensional TIN model (triangulated irregular network), which is a collection of triangular planes connected with the point group data as vertices, and it is possible to derive data corresponding to the latitude, longitude, and height of each point on the road surface. Even when the point group data of each point in the survey area is not acquired by the 3D scanner 4, it is possible to derive data corresponding to the latitude, longitude, and height of each point.

In Step S11 (elevation difference derivation step), by pressing and designating a predetermined position in the periphery of a manhole on the basis of the ortho-image displayed on the display surface 5a of the display unit 5, the plane position (latitude and longitude) of the predetermined position is displayed as illustrated in FIG. 27. Therefore, by changing the designated position in the periphery of a manhole in the ortho-image displayed on the display surface 5a of the display unit 5, two plane positions of the manhole in the longitudinal direction upstream and downstream, and two plane positions of the manhole in the transverse direction upstream and downstream are detected.

With regard to the elevation of each position in the periphery of the manhole at the time of starting the repair, the plane position of each position in the periphery of the manhole has been detected, and thus the elevation of the plane position is derived on the basis of the point group data acquired by the 3D scanner 4. In this embodiment, with the ortho-image and the point group data acquired by the 3D scanner 4, the elevation can be derived for all plane positions in the ortho-image on the basis of the point group data acquired by the 3D scanner 4. The elevation of each position in the repair planning plane is retrieved from the planning plane data indicating the repair planning plane obtained in Step S9.

Figure 28:
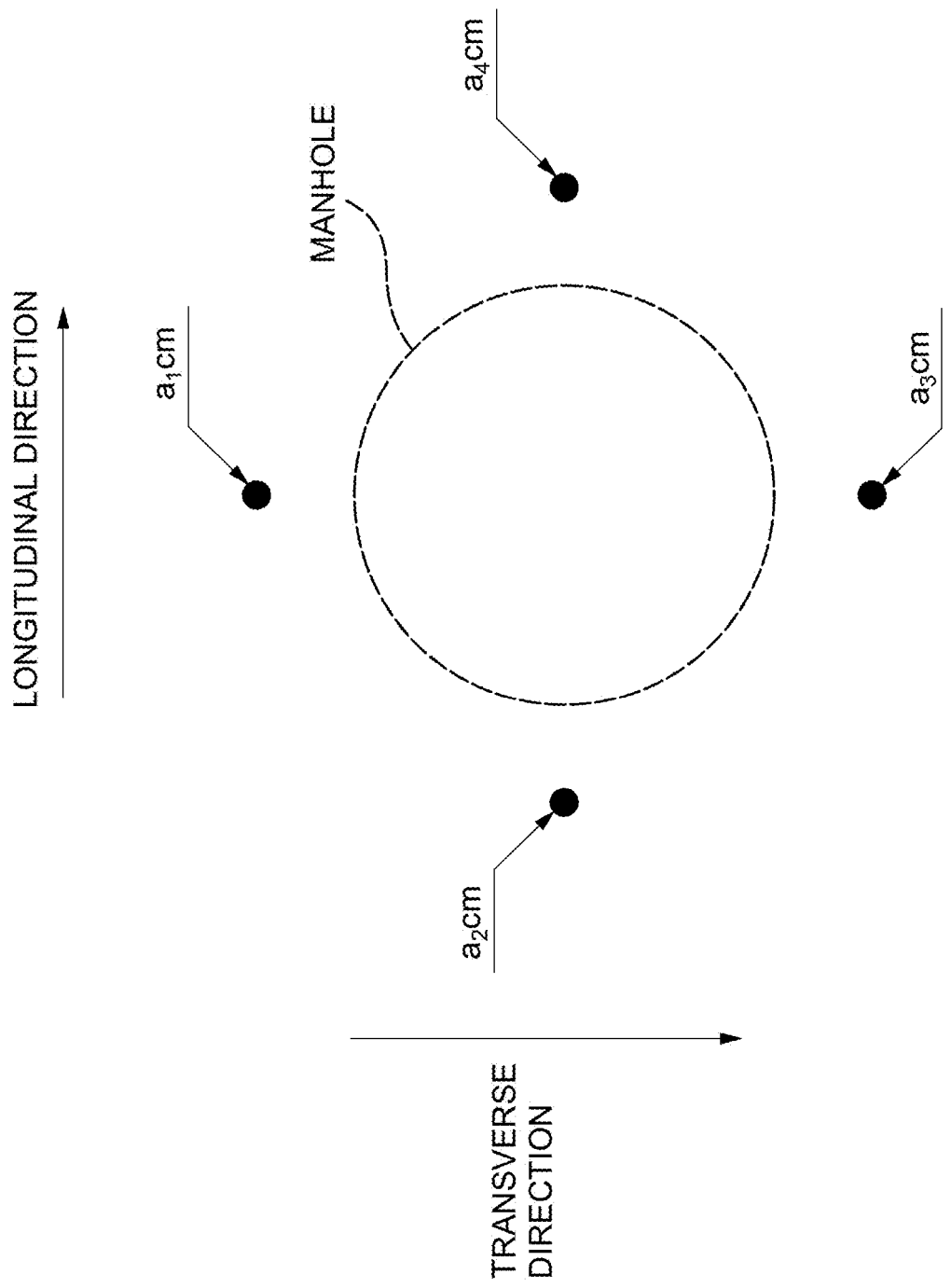
FIG. 28 is a diagram illustrating the adjustment height for each position in the periphery of a manhole.

The elevation difference between the elevation of each position in the periphery of a manhole at the time of starting the repair and the elevation of each position in the repair planning plane is then derived as the adjustment height. Therefore, the adjustment heights of the two points upstream and downstream of the manhole in the longitudinal direction and the adjustment heights of the two points upstream and downstream of the manhole in the transverse direction are derived. FIG. 28 illustrates that the adjustment heights for each position in the periphery of the manhole are a1 cm, a2 cm, a3 cm and a4 cm, respectively. Thus, a1 cm is the adjustment height upstream of the manhole in the transverse direction, a2 cm is the adjustment height upstream of the manhole in the longitudinal direction, a3 cm is the adjustment height downstream of the manhole in the transverse direction, and a4 cm is the adjustment height downstream of the manhole in the longitudinal direction.

(Road Survey Method 4)

A survey method for the distance between two designated points on the road surface will be described with reference to FIG. 29.

The survey on the distance between two designated points on the road surface is based on the ortho-images displayed on the display unit 5, when various distances are required for road repair. The distance required for road repair includes, for example, the length of the road repair section, the width of the road, and the length of a given area of the road surface.

In Step S101 (point group data acquisition step), the point group data of each point in the road surface around the repair part is acquired by the 3D scanner 4. The point group data acquired by the 3D scanner 4 is converted into a three-dimensional TIN model (triangulated irregular network), which is a collection of triangular planes connected with the point group data as vertices, and it is possible to derive data corresponding to the latitude, longitude, and height of each point on the road surface. Even when the point group data of each point in the survey area is not acquired by the 3D scanner 4, it is possible to derive data corresponding to the latitude, longitude, and height of each point.

In Step S102 (coordinate acquisition step), in the periphery of a repair part where road repair is performed, the three-dimensional coordinates, that is, plane positions (latitudes and longitudes) and elevations (heights) are acquired for a plurality of predetermined positions, that is, predetermined positions where the plurality of survey markers 6 are installed, on the basis of the point group data acquired by Step S101. The three-dimensional coordinates of the plurality of predetermined positions may be acquired by the total station 2.

In Step S103 (photography step), the road is photographed from the sky by the UAV 3 flying at an altitude of 20 meters or less above the ground. When photographing is performed, a plurality of survey markers 6 are previously installed at a plurality of predetermined positions where three-dimensional coordinates have been acquired in Step S102. Therefore, for the plurality of survey markers 6, a plurality of photographed images are photographed in such a manner that each survey marker 6 is included in at least two of the photographed images.

In Step S104 (ortho-image creation step), an ortho-image is created on the basis of the three-dimensional coordinates acquired by Step S102 and the plurality of photographed images photographed by Step S103. At that time, the ortho-image created by Step S104 is associated with the point group data acquired by Step S101. That is, each point in the ortho-image is associated with three-dimensional coordinates of the point group data, and each point on the ortho-image corresponds to a plane position (latitude, longitude) and elevation (height), respectively.

Figure 30:
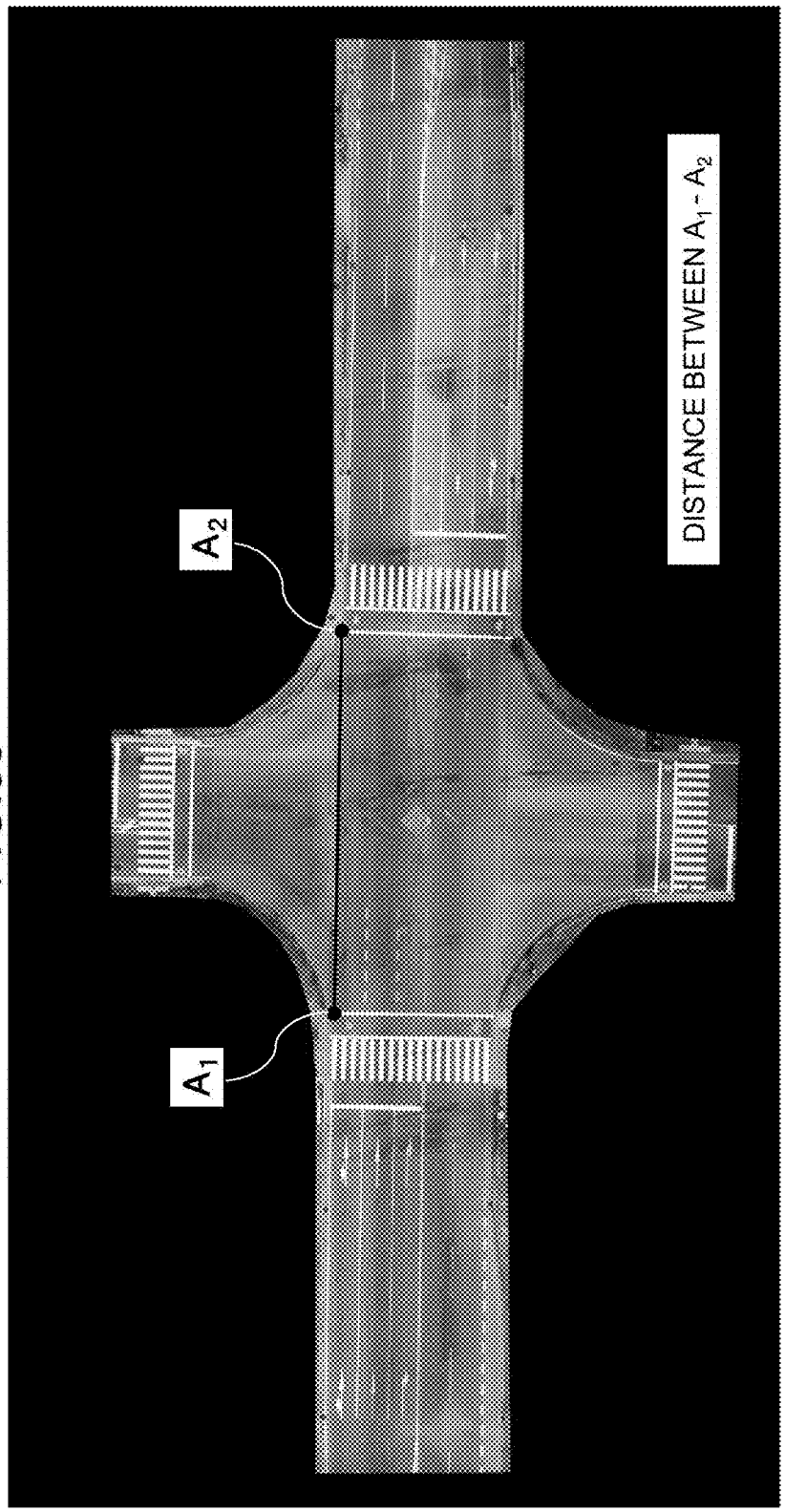
FIG. 30 is a view indicating a state in which a distance between designated points on a road surface is displayed.

In Step S105 (display step), the ortho-image is displayed on the display unit 5 as illustrated in FIG. 6. In Step S106 (distance display step), by pressing and designating two designated points on the road surface on the ortho-image displayed on the display surface 5*a* of the display unit 5, the distance between the designated points is displayed. For example, as illustrated in FIG. 30, when two designated points A1 and A2 of an intersection are designated, the distance between the designated points A1-A2 is displayed. Therefore, even if the various distances required for the road repair are not measured when the road is photographed from the sky by the UAV 3 flying at an altitude of 20 meters or less above the ground in Step S103 (photography step), the distances between the various designated points within the range of the ortho-image can be detected by changing the positions of the two designated points on the road surface in the ortho-image displayed on the display surface 5*a* of the display unit 5.

(Road Survey Method 5)

A survey method for a planar dimension in a designated range of a road surface will be described with reference to FIG. 31.

The survey on a planar dimension in a designated range of a road surface is based on the ortho-images displayed on the display unit 5, when various area planar dimensions are required for road repair. The planar dimension of the area required for road repair is, for example, the planar dimension of the road repair section.

In Step S101 (point group data acquisition step), the point group data of each point in the road surface around the repair part is acquired by the 3D scanner 4. The point group data acquired by the 3D scanner 4 is converted into a three-dimensional TIN model (triangulated irregular network), which is a collection of triangular planes connected with the point group data as vertices, and it is possible to derive data corresponding to the latitude, longitude, and height of each point on the road surface. Even when the point group data of each point in the survey area is not acquired by the 3D scanner 4, it is possible to derive data corresponding to the latitude, longitude, and height of each point.

In Step S102 (coordinate acquisition step), in the periphery of a repair part where road repair is performed, the three-dimensional coordinates, that is, plane positions (latitudes and longitudes) and elevations (heights) are acquired for a plurality of predetermined positions, that is, predetermined positions where the plurality of survey markers 6 are installed, on the basis of the point group data acquired by Step S101. The three-dimensional coordinates of the plurality of predetermined positions may be acquired by the total station 2.

In Step S103 (photography step), the road is photographed from the sky by the UAV 3 flying at an altitude of 20 meters or less above the ground. When photographing is performed, a plurality of survey markers 6 are previously installed at a plurality of predetermined positions where three-dimensional coordinates have been acquired in Step S102. Therefore, for the plurality of survey markers 6, a plurality of photographed images are photographed in such a manner that each survey marker 6 is included in at least two of the photographed images.

In Step S104 (ortho-image creation step), an ortho-image is created on the basis of the three-dimensional coordinates acquired by Step S102 and the plurality of photographed images photographed by Step S103. At that time, the ortho-image created by Step S104 is associated with the point group data acquired by Step S101. That is, each point in the ortho-image is associated with three-dimensional coordinates of the point group data, and each point on the ortho-image corresponds to a plane position (latitude, longitude) and elevation (height), respectively.

In Step S105 (display step), the ortho-image is displayed on the display unit 5 as illustrated in FIG. 6. In Step S108 (planar dimension display step), by designating the designated range of a road surface on the ortho-image displayed on the display surface 5*a* of the display unit 5, the planar dimension in the designated range is displayed, as illustrated in FIG. 32. For example, as illustrated in FIG. 32, when a designated range (shaded portion) indicating the upper portion of an intersection is designated, the planar dimension of the designated range is displayed. Therefore, even if the various areas required for the road repair are not measured when the road is photographed from the sky by the UAV 3 flying at an altitude of 20 meters or less above the ground in Step S103 (photography step), various area planar dimensions within the range of the ortho-image can be detected by changing the positions of the designated range of the road surface in the ortho-image displayed on the display surface 5a of the display unit 5.

The ortho-image creation system 1 of the present embodiment includes a coordinate storage unit 11 that stores three-dimensional coordinates of a plurality of survey markers 6, a photographed image storage unit 12 that stores a plurality of photographed images of the plurality of survey markers 6 photographed by a UAV 3 flying at an altitude of 20 meters or less above the ground in such a manner that each survey marker 6 is included in at least two of the photographed images, and an ortho-image creation unit 13 that creates an ortho-image on the basis of the three-dimensional coordinates of each survey marker 6 stored in the coordinate storage unit 11 and the plurality of photographed images stored in the photographed image storage unit 11.

The ortho-image creation method of the present embodiment includes a coordinate acquisition step to acquire three-dimensional coordinates of a plurality of survey markers 6, a photography step to photograph a plurality of photographed images of the plurality of survey markers 6 by a UAV 3 flying at an altitude of 20 meters or less above the ground in such a manner that each survey marker 6 is included in at least two of the photographed images, and an ortho-image creation step to create an ortho-image on the basis of the three-dimensional coordinates of each feature point acquired by the coordinate acquisition step and the plurality of photographed images photographed by the photography step.

As a result, the ortho-image creation system 1 and the ortho-image creation method of this embodiment create an ortho-image on the basis of a plurality of photographed images photographed by the UAV 3 flying at an altitude of 20 meters or less above the ground, thereby making it possible to create an ortho-image in which the condition of a road surface and the location of plane elements around the road can be clearly distinguished. In the ortho-image created by this embodiment, it is possible to clearly distinguish the places where cracks and patching have occurred in a road. Therefore, it is not necessary to drive a special road surface condition survey vehicle to survey the cracking condition of a road surface, and it is possible to survey the road condition regardless of the road width.

In addition, in the ortho-image created by this embodiment, it is possible to clearly distinguish the locations of plane elements including the edges of the road and division lines such as lane marking lines. Therefore, there is no need to survey on a large number of plane positions in order to illustrate the plane elements including the edges of the road and division lines such as lane marking lines, and thus it is possible to easily illustrate the plane elements on the basis of an ortho-image.

In addition, in the ortho-image created by this embodiment, each plane position in the periphery of a manhole in the longitudinal and transverse directions can be detected. Therefore, after identifying each plane position in the periphery of a manhole in the longitudinal and transverse directions, the elevation of each plane position can be retrieved from the point group data acquired by a three-dimensional scanning device. Therefore, it is not necessary to create a road longitudinal section and a road transverse section for each manhole in order to detect the elevation of each plane position in the periphery of a manhole in the longitudinal and transverse directions, respectively. Consequently, it is possible to easily detect the manhole adjustment height.

In the ortho-image creation system 1 of this embodiment, the survey marker 6 installed on the ground is used when photographing with the UAV 3, and the coordinate storage unit 11 stores the three-dimensional coordinates of the survey marker 6 acquired by the total station 2.

In the ortho-image creation method of this embodiment, the survey marker 6 installed on the ground is used at the time of photographing in the photography step, and in the coordinate acquisition step, three-dimensional coordinates of the survey marker 6 are acquired by the total station 2.

As a result, in the ortho-image creation system 1 and the ortho-image creation method of this embodiment, it is possible to supply three-dimensional coordinates to the ortho-image on the basis of the three-dimensional coordinates of the survey marker 6 included in the photographed image photographed by the UAV 3.

The road survey method of the present embodiment includes a coordinate acquisition step to acquire three-dimensional coordinates of a plurality of survey markers 6, a photography step to photograph a plurality of photographed images of the plurality of survey markers 6 by a UAV 3 flying at an altitude of 20 meters or less above the ground in such a manner that each survey marker 6 is included in at least two of the photographed images, an ortho-image creation step to create an ortho-image on the basis of the three-dimensional coordinates of survey marker 6 acquired by the coordinate acquisition step and the plurality of photographed images photographed by the photography step, a display step to display the ortho-image on the display unit 5, a derivation step to divide a survey area into a plurality of survey ranges in the ortho-image displayed on the display unit 5 and derive a cracking rate or patching rate for each of the plurality of survey ranges, and a road condition display step to add a color according to a level of the cracking rate or patching rate of each survey range derived by the derivation step to the ortho-image displayed on the display unit 5 to display a road condition.

As a result, the road survey method of this embodiment creates an ortho-image on the basis of a plurality of photographed images photographed by the UAV 3 flying at an altitude of 20 meters or less above the ground, thereby making it possible to create an ortho-image in which the condition of a road surface and the location of plane elements around the road can be clearly distinguished. In the ortho-image created by this embodiment, it is possible to clearly distinguish the places where cracks and patching have occurred in a road. Therefore, it is not necessary to drive a special road surface condition survey vehicle to survey the cracking condition of a road surface, and it is possible to survey the road condition regardless of the road width.

The road survey method of the present embodiment includes a coordinate acquisition step to acquire three-dimensional coordinates of a plurality of survey markers 6, a photography step to photograph a plurality of photographed images of the plurality of survey markers 6 by a UAV 3 flying at an altitude of 20 meters or less above the ground in such a manner that each survey marker 6 is included in at least two of the photographed images, an ortho-image creation step to create an ortho-image on the basis of the three-dimensional coordinates of survey marker 6 acquired by the coordinate acquisition step and the plurality of photographed images photographed by the photography step, a display step to display the ortho-image on the display unit 5, and a plane element illustration step to trace a plane element in the ortho-image displayed on the display unit 5 to illustrate the plane element.

As a result, the road survey method of this embodiment can create an ortho-image on the basis of a plurality of photographed images photographed by the UAV 3 flying at an altitude of 20 meters or less above the ground, thereby making it possible to create an ortho-image in which the condition of a road surface and the location of plane elements around the road can be clearly distinguished. In the ortho-image created by the present invention, it is possible to clearly distinguish the locations of plane elements including the edges of the road and division lines such as lane marking lines. Therefore, there is no need to survey on a large number of plane positions in order to illustrate the plane elements including the edges of the road and division lines such as lane marking lines, and thus it is possible to easily illustrate the plane elements on the basis of an ortho-image.

The road survey method of the present embodiment includes a coordinate acquisition step to acquire three-dimensional coordinates of a plurality of survey markers 6, a photography step to photograph a plurality of photographed images of the plurality of survey markers 6 by a UAV 3 flying at an altitude of 20 meters or less above the ground in such a manner that each survey marker 6 is included in at least two of the photographed images, an ortho-image creation step to create an ortho-image on the basis of the three-dimensional coordinates of survey marker 6 acquired by the coordinate acquisition step and the plurality of photographed images photographed by the photography step, a display step to display the ortho-image on the display unit 5, a point group data acquisition step to acquire point group data of an area including the periphery of a manhole in the ortho-image displayed on the display unit 5, and an elevation difference derivation step to derive the elevation difference from the elevation in the periphery of a manhole in a repair planning plane.

As a result, the road survey method according to this embodiment creates an ortho-image on the basis of a plurality of photographed images photographed by the UAV 3 flying at an altitude of 20 meters or less above the ground, thereby making it possible to create an ortho-image in which the condition of a road surface and the location of plane elements around the road can be clearly distinguished. In the ortho-image created by the present invention, each plane position in the periphery of a manhole in the longitudinal and transverse directions can be detected. Therefore, after identifying each plane position in the periphery of a manhole in the longitudinal and transverse directions, the elevation of each plane position can be derived on the basis of the point group data of an area including the periphery of the manhole. Therefore, it is not necessary to create a road longitudinal section and a road transverse section for each manhole in order to detect the elevation of each plane position in the periphery of a manhole in the longitudinal and transverse directions, respectively. Consequently, it is possible to easily detect the manhole adjustment height.

The road survey method according to the present embodiment includes a coordinate acquisition step to acquire three-dimensional coordinates of a plurality of survey markers 6, a photography step to photograph a plurality of photographed images of the plurality of survey markers 6 by a UAV 3 flying at an altitude of 20 meters or less above the ground in such a manner that each survey marker 6 is included in at least two of the photographed images, an ortho-image creation step to create an ortho-image on the basis of the three-dimensional coordinates of survey marker 6 acquired by the coordinate acquisition step and the plurality of photographed images photographed by the photography step, a point group data acquisition step to acquire point group data of an area including the plurality of survey markers 6, a display step to display the ortho-image on the display unit 5, a designation step to designate two designated points separated from each other in the ortho-image displayed on the display unit 5, and a distance display step to display the distance between the two designated points when the two designated points are designated by the designation step.

As a result, the road survey method according to the present invention creates an ortho-image on the basis of a plurality of photographed images photographed by the UAV 3 flying at an altitude of 20 meters or less above the ground and associates the ortho-image with the point group data of an area in the ortho-image, thereby making it possible to display, for example, the distance between two designated points in the road periphery area while clearly distinguishing the locations of plane elements including the edges of the road and division lines such as lane marking lines. Therefore, even if the surveyor does not measure the distance between two designated points on the road periphery area in the road periphery area, the distance between the two designated points can be easily detected by designating the two designated points on the display unit 5 on which the ortho-image is displayed.

The road survey method according to the present invention includes a coordinate acquisition step to acquire three-dimensional coordinates of a plurality of survey markers 6, a photography step to photograph a plurality of photographed images of the plurality of survey markers 6 by a UAV 3 flying at an altitude of 20 meters or less above the ground in such a manner that each survey marker 6 is included in at least two of the photographed images, an ortho-image creation step to create an ortho-image on the basis of the three-dimensional coordinates of survey marker 6 acquired by the coordinate acquisition step and the plurality of photographed images photographed by the photography step, a point group data acquisition step to acquire point group data of an area including the plurality of survey markers 6, a display step to display the ortho-image on the display unit 5, a designation step to designate a designated range in the ortho-image displayed on the display unit 5, and a planar dimension display step to display the planar dimension of the designated range when the designated range is designated by the designation step.

As a result, the road survey method according to the present invention creates an ortho-image on the basis of a plurality of photographed images photographed by the UAV 3 flying at an altitude of 20 meters or less above the ground and associates the ortho-image with the point group data of an area in the ortho-image, thereby making it possible to display, for example, the planar dimension of the designated range in the road periphery area in the ortho-image while clearly distinguishing the locations of plane elements including the edges of the road and division lines such as lane marking lines. Therefore, even if the surveyor does not measure the planar dimension of the designated range on the road periphery area in the road periphery area, the planar dimension of the designated range can be easily detected by designating the designated range on the display unit 5 on which the ortho-image is displayed.

While the embodiments of the present invention are described above, the specific configuration of each component is not limited to the above embodiments, and various variations are possible without departing from the spirits of the present invention.

In the above embodiment, the ortho-image is created on the basis of the photographed images photographed from the sky above the road by the UAV 3 flying at an almost constant altitude, but the present invention includes creating the ortho-image on the basis of photographed images photographed from the sky above the road by the UAV 3 flying at a different altitude of 20 meters or less above the ground.

In the above embodiment, the three-dimensional coordinates of each survey marker 6 installed around a road are acquired by the total station 2. However, the three-dimensional coordinates of the survey marker 6 installed around a road may be acquired by a GNSS (Global Navigation Satellite System) which is a positioning system using satellites such as a GPS, for example. The three-dimensional coordinates of each survey marker 6 installed around a road may be acquired by scanning with the 3D scanner 4.

The survey marker 6 of the above embodiment has a pattern that makes clear the central position used as the rating point, but the survey marker 6 has a pattern with which a position other than the central position of the survey marker 6 is identified, and a position other than the central position may be used as the rating point.

In addition, in the above embodiment, a plurality of survey markers 6 are installed at intervals of, for example, 5 to 15 meters along the edge of the road (in the longitudinal direction of the road), but the arrangement of the plurality of survey markers 6 is freely determined. Therefore, a plurality of survey markers 6 may be installed at intervals of, for example, one meter or less along the width of a road. In addition, in Step S1 (coordinate acquisition step), the three-dimensional coordinates at the predetermined positions where the plurality of survey markers 6 are installed are acquired by the total station 2. However, when the three-dimensional coordinates at the predetermined positions are already acquired, the three-dimensional coordinates may be acquired.

In addition, in the above embodiment, the plate-like survey markers 6 are installed on a road surface, but a pattern similar to each survey marker 6 may be formed on the road surface by any material such as paint, instead of use of the plate-like survey marker 6. For example, a pattern of the same shape as white portions in the survey marker 6 of FIG. 3 may be sprayed on an asphalt surface of a road with paint of a different color from the asphalt surface, and the pattern similar to the survey marker 6 may be formed. When the survey marker is formed on the road surface by any material such as paint, the type, the shape, the size, and the pattern of the survey marker are also freely determined.

In the above embodiment, a road was photographed by an unmanned aerial vehicle (including a photography device) flying at an altitude of 20 meters or less above the ground, but the road may also be photographed by a model aerial vehicle (including a photography device) flying at an altitude of 20 meters or less above the ground. In the present invention, the unmanned aerial vehicle is an airplane, a rotorcraft, an airship, or the like which cannot be boarded by a person, and which can be flown by remote control or automatic control, such as a drone (multicopter), a radio-controlled plane, or the like. The model aerial vehicle is, for example, a multicopter, radio-controlled plane, or the like, and weighs less than 200 grams, which is the sum of the weight of an aerial vehicle body and the weight of a battery.

In the above embodiment, the survey marker 6 installed on the ground at the time of photographing is used as a feature point for connecting the plurality of photographed images, and the three-dimensional coordinates of the survey marker 6 are respectively acquired by the total station 2. If a predetermined point in the image photographed by the UAV 3 is used as the feature point for connecting the plurality of images photographed by the UAV 3, and the point group data in three-dimensional coordinates for each point in the photographed image including the predetermined point has already been acquired by scanning with the 3D scanner 4, the three-dimensional coordinates of the predetermined point may be acquired from the point group data.

In the above embodiment, examples of ortho-image creation and road survey methods have been described. However, the order of Step S1 and Step S2 may be opposite in FIGS. 5, 14, 18, and 23. Therefore, it is possible to photograph the photographed images after acquiring the three-dimensional coordinates of the survey markers 6, as well as to acquire the three-dimensional coordinates of the survey markers 6 after photographing the photographed images.

In the above embodiment, examples of ortho-image creation and road survey methods have been described. However, the order of Step S102 and Step S103 may be opposite in FIGS. 29 and 31. Therefore, it is possible to photograph the photographed images after acquiring the three-dimensional coordinates of the survey markers 6, as well as to acquire the three-dimensional coordinates of the survey markers 6 after photographing the photographed images.

Figure 29:
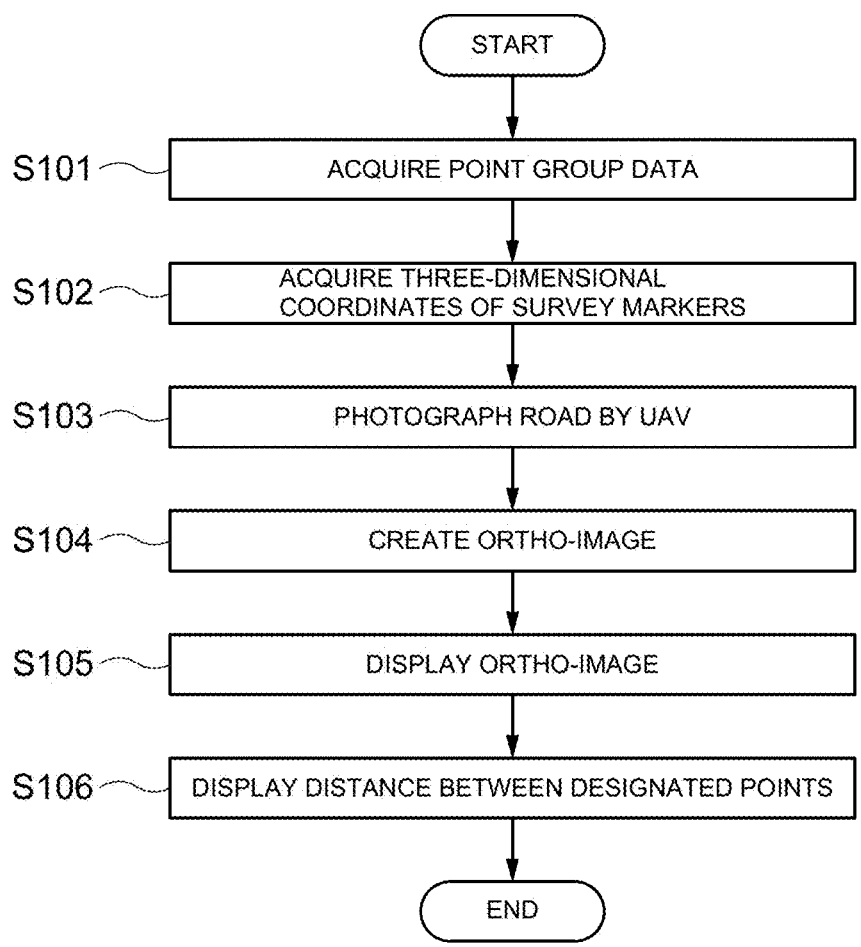
FIG. 29 is a chart illustrating a survey method for a distance between designated points on a road surface.
Figure 31:
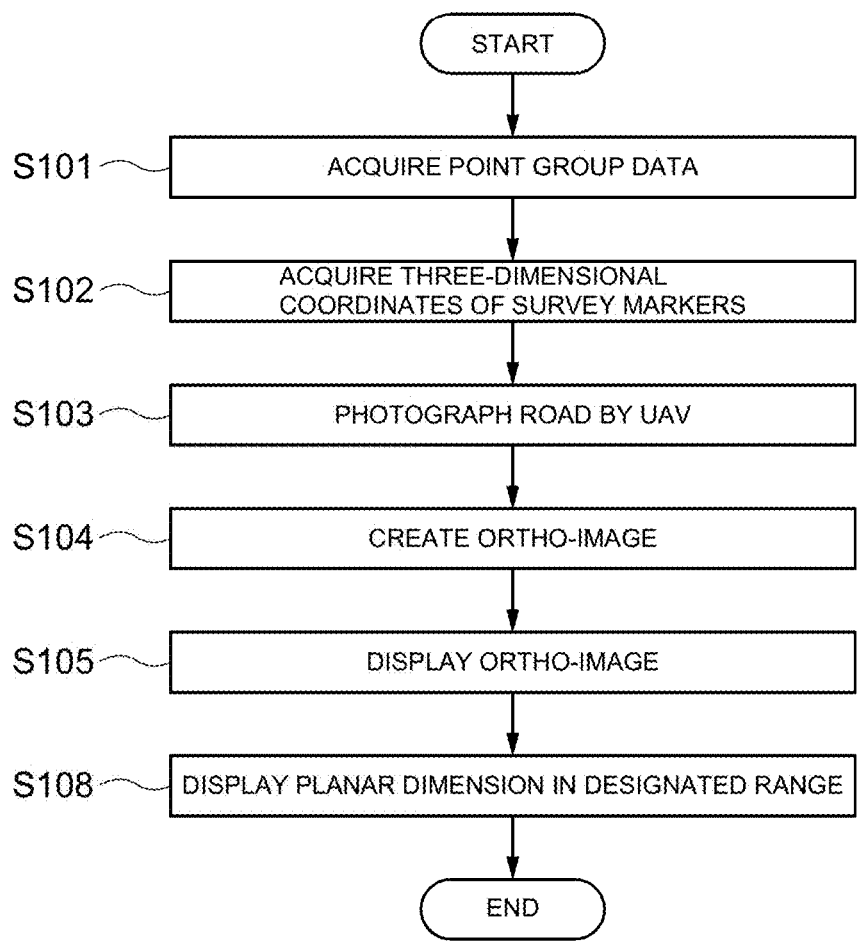
FIG. 31 is a chart illustrating a survey method for a planar dimension in a designated range of a road surface.

In addition, in FIGS. 29 and 31, the order of Step S101 and Step S103 may be opposite. Therefore, although the point group data of the area including the plurality of survey markers 6 is acquired after the point group data of the area including the plurality of survey markers 6 is acquired, the photographed image of the area including the plurality of survey markers 6 may be acquired after the image of the area including the plurality of survey markers 6 is photographed.

In the above embodiment, as a survey conducted using ortho-images created by the ortho-image creation apparatus 10, the survey on cracking (crack) condition of a road surface, the survey on the locations of plane elements around the road, the survey for repairing the periphery of a manhole, the survey on a distance between two designated points on the road surface, and the survey on the planar dimension in a designated range of the road surface has been described. However, the ortho-images created by the ortho-image creation apparatus 10 may be used for other surveys.

INDUSTRIAL APPLICABILITY

The present invention can be used, for example, as an ortho-image creation system and an ortho-image creation method for creating ortho-images on the basis of photographed images photographed from the sky by an unmanned aerial vehicle.

REFERENCE SIGNS LIST

1 . . . ortho-image creation system
2 . . . total station
3 . . . UAV (unmanned aerial vehicle)
4 . . . 3D scanner (three-dimensional scanning device)
5 . . . display unit
6 . . . survey marker
10 . . . ortho-image creation apparatus
11 . . . photographed image storage unit (photographed image storage means)

12 ... ortho-image creation unit (ortho-image creation means)
13 ... coordinate storage unit (coordinate storage means)
14 ... display control unit

The invention claimed is:

1. A survey marker used for the ortho-image creation system,
wherein the ortho-image creation system comprises:
a coordinate storage means to store three-dimensional coordinates of a plurality of feature points;
a photographed image storage means to store a plurality of photographed images of the plurality of feature points photographed by an unmanned aerial vehicle or a model aerial vehicle flying at an altitude of 20 meters or less above a ground in such a manner that each feature point is included in at least two of the photographed images; and
an ortho-image creation means to create an ortho-image on a basis of the three-dimensional coordinates of each feature point stored in the coordinate storage means and the plurality of photographed images stored in the photographed image storage means,
wherein the feature point is a survey marker installed on a ground at a time of photographing by the unmanned aerial vehicle or the model aerial vehicle, and
wherein the coordinate storage means stores three-dimensional coordinates of the survey marker acquired by any of a total station, a positioning system using satellites, and a three-dimensional scanning device,
wherein the survey marker is a seal-like marker having a back surface formed with an adhesive layer.

2. A survey marker used for the ortho-image creation method,
wherein the ortho-image creation method comprises:
a coordinate acquisition step to acquire three-dimensional coordinates of a plurality of feature points;
a photography step to photograph a plurality of photographed images of the plurality of feature points by an unmanned aerial vehicle or a model aerial vehicle flying at an altitude of 20 meters or less above a ground in such a manner that each feature point is included in at least two of the photographed images; and
an ortho-image creation step to create an ortho-image on a basis of the three-dimensional coordinates of each feature point acquired by the coordinate acquisition step and the plurality of photographed images photographed by the photography step,
wherein the feature point is a survey marker installed on a ground at a time of photographing in the photography step, and
wherein in the coordinate acquisition step, three-dimensional coordinates of the survey marker are acquired by any of a total station, a positioning system using satellites, and a three-dimensional scanning device,
wherein the survey marker is a seal-like marker having a back surface formed with an adhesive layer.

3. A road survey method, comprising:
a coordinate acquisition step to acquire three-dimensional coordinates of a plurality of feature points;
a photography step to photograph a plurality of photographed images of the plurality of feature points by an unmanned aerial vehicle or a model aerial vehicle flying at an altitude of 20 meters or less above a ground in such a manner that each feature point is included in at least two of the photographed images;
an ortho-image creation step to create an ortho-image on a basis of the three-dimensional coordinates of each feature point acquired by the coordinate acquisition step and the plurality of photographed images photographed by the photography step;
a display step to display the ortho-image on a display unit,
a derivation step to divide a survey area into a plurality of survey ranges in the ortho-image displayed on the display unit and derive a cracking rate or patching rate for each of the plurality of survey ranges; and
a road condition display step to add a color according to a level of the cracking rate or patching rate of each survey range derived by the derivation step to the ortho-image displayed on the display unit to display a road condition.

4. A road survey method according to claim 3, comprising:
a plane element illustration step to trace a plane element in the ortho-image displayed on the display unit to illustrate the plane element.

5. A road survey method, comprising:
a coordinate acquisition step to acquire three-dimensional coordinates of a plurality of feature points;
a photography step to photograph a plurality of photographed images of the plurality of feature points by an unmanned aerial vehicle or a model aerial vehicle flying at an altitude of 20 meters or less above a ground in such a manner that each feature point is included in at least two of the photographed images;
an ortho-image creation step to create an ortho-image on a basis of the three-dimensional coordinates of each feature point acquired by the coordinate acquisition step and the plurality of photographed images photographed by the photography step;
a display step to display the ortho-image on a display unit,
a point group data acquisition step to acquire point group data of an area including a periphery of a manhole in the ortho-image; and
an elevation difference derivation step to derive an elevation difference between an elevation in the periphery of the manhole in the ortho-image displayed on the display unit and an elevation in the periphery of the manhole in a repair planning plane.

6. A road survey method according to claim 3, comprising:
a point group data acquisition step to acquire point group data of an area including the plurality of feature points;
a designation step to designate two designated points separated from each other in the ortho-image displayed on the display unit; and
a distance display step to display a distance between the two designated points when the two designated points are designated by the designation step.

7. A road survey method according to claim 3, comprising:
a point group data acquisition step to acquire point group data of an area including the plurality of feature points;
a designation step to designate a designated range in the ortho-image displayed on the display unit; and
a planar dimension display step to display a planar dimension of the designated range when the designated range is designated by the designation step.

8. The survey marker according to claim 1,
wherein the feature point is a predetermined point in an image photographed by the unmanned aerial vehicle or the model aerial vehicle, and
wherein the coordinate storage means stores three-dimensional coordinates of the predetermined point retrieved from point group data in three-dimensional coordinates acquired for each point in the photographed image.

9. The survey marker according to claim 2,
wherein the feature point is a predetermined point in an image photographed by the unmanned aerial vehicle or the model aerial vehicle, and
wherein in the coordinate acquisition step, three-dimensional coordinates of the predetermined point are acquired from point group data in three-dimensional coordinates acquired for each point in the photographed image.

10. A road survey method according to claim 5, comprising:
a plane element illustration step to trace a plane element in the ortho-image displayed on the display unit to illustrate the plane element.

11. A road survey method according to claim 5, comprising:
a point group data acquisition step to acquire point group data of an area including the plurality of feature points;
a designation step to designate two designated points separated from each other in the ortho-image displayed on the display unit; and
a distance display step to display a distance between the two designated points when the two designated points are designated by the designation step.

12. A road survey method according to claim 5, comprising:
a point group data acquisition step to acquire point group data of an area including the plurality of feature points;
a designation step to designate a designated range in the ortho-image displayed on the display unit; and
a planar dimension display step to display a planar dimension of the designated range when the designated range is designated by the designation step.

* * * * *